(12) United States Patent
Itoh

(10) Patent No.: US 7,804,942 B2
(45) Date of Patent: Sep. 28, 2010

(54) TONE DETECTOR JUDGING A DETECTION OF A PREDETERMINED TONE SIGNAL BY COMPARING A CHARACTERISTIC QUANTITY OF THE TONE SIGNAL WITH CHARACTERISTIC QUANTITIES OF OTHER SIGNALS

(75) Inventor: Masanori Itoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1059 days.

(21) Appl. No.: 11/201,169

(22) Filed: Aug. 11, 2005

(65) Prior Publication Data

US 2006/0008074 A1 Jan. 12, 2006

Related U.S. Application Data

(62) Division of application No. 10/319,528, filed on Dec. 16, 2002, now Pat. No. 7,035,394.

(30) Foreign Application Priority Data

Dec. 17, 2001 (JP) ............................. 2001-383298
Dec. 21, 2001 (JP) ............................. 2001-389891

(51) Int. Cl.
*H04M 11/00* (2006.01)

(52) U.S. Cl. .................................. 379/93.27

(58) Field of Classification Search ............... 379/93.27
See application file for complete search history.

(56) References Cited

U.S. PATENT DOCUMENTS

| 5,319,703 | A | 6/1994 | Drory |
|---|---|---|---|
| 5,321,745 | A | 6/1994 | Drory et al. |
| 5,428,680 | A | 6/1995 | Murata et al. |
| 5,459,785 | A | 10/1995 | Noda |
| 5,588,052 | A | 12/1996 | Murata et al. |
| 5,592,544 | A | 1/1997 | Murata et al. |
| 5,623,609 | A | 4/1997 | Kaye et al. |
| 5,668,858 | A | 9/1997 | Mukai |
| 5,689,556 | A | 11/1997 | Gupta et al. |
| 5,742,801 | A | 4/1998 | Fukushima et al. |
| 5,809,133 | A | 9/1998 | Bartkowiak et al. |

(Continued)

FOREIGN PATENT DOCUMENTS

EP 0 575 725 A2 12/1993

(Continued)

OTHER PUBLICATIONS

Raman et al., "Fast Echo Cancellation in a Voice-Processing System," IEEE, 1992.

*Primary Examiner*—Alexander Jamal
(74) *Attorney, Agent, or Firm*—Dickstein Shapiro LLP

(57) ABSTRACT

A tone transmission part transmits a tone signal. A tone signal detection part detects data representing an echo signal of the tone signal transmitted by the tone transmission part, and detects data representing a predetermined tone signal targeted to be detected. The tone signal detection part also detects data representing tone signals of all of input signals. A tone judgment part excludes the data representing the echo signal from the data representing the tone signals of all of the input signals so as to judge a detection of the predetermined tone signal.

15 Claims, 17 Drawing Sheets

U.S. PATENT DOCUMENTS

| | | |
|---|---|---|
| 5,815,568 A | 9/1998 | Trump |
| 6,249,762 B1 | 6/2001 | Kirsteins et al. |
| 6,269,160 B1 | 7/2001 | Bartkowiak |
| 6,415,139 B1 | 7/2002 | Shimbo |
| 6,560,331 B1 | 5/2003 | Cooklev et al. |
| 6,661,880 B1 | 12/2003 | Poulis et al. |
| 6,694,010 B1 | 2/2004 | Verreault |
| 6,782,095 B1 | 8/2004 | Leong et al. |
| 2002/0076034 A1 | 6/2002 | Prabhu et al. |
| 2002/0080953 A1 | 6/2002 | Harada |
| 2002/0080954 A1* | 6/2002 | Felder et al. .............. 379/386 |

FOREIGN PATENT DOCUMENTS

| | | |
|---|---|---|
| JP | 06-153244 | 5/1994 |
| WO | WO 99/41893 | 8/1999 |

* cited by examiner

POWER OF TONE TO BE DETECTED

POWER OF ECHO TONE

POWER OF INPUT SIGNALS
EXCEPT ECHO TONE

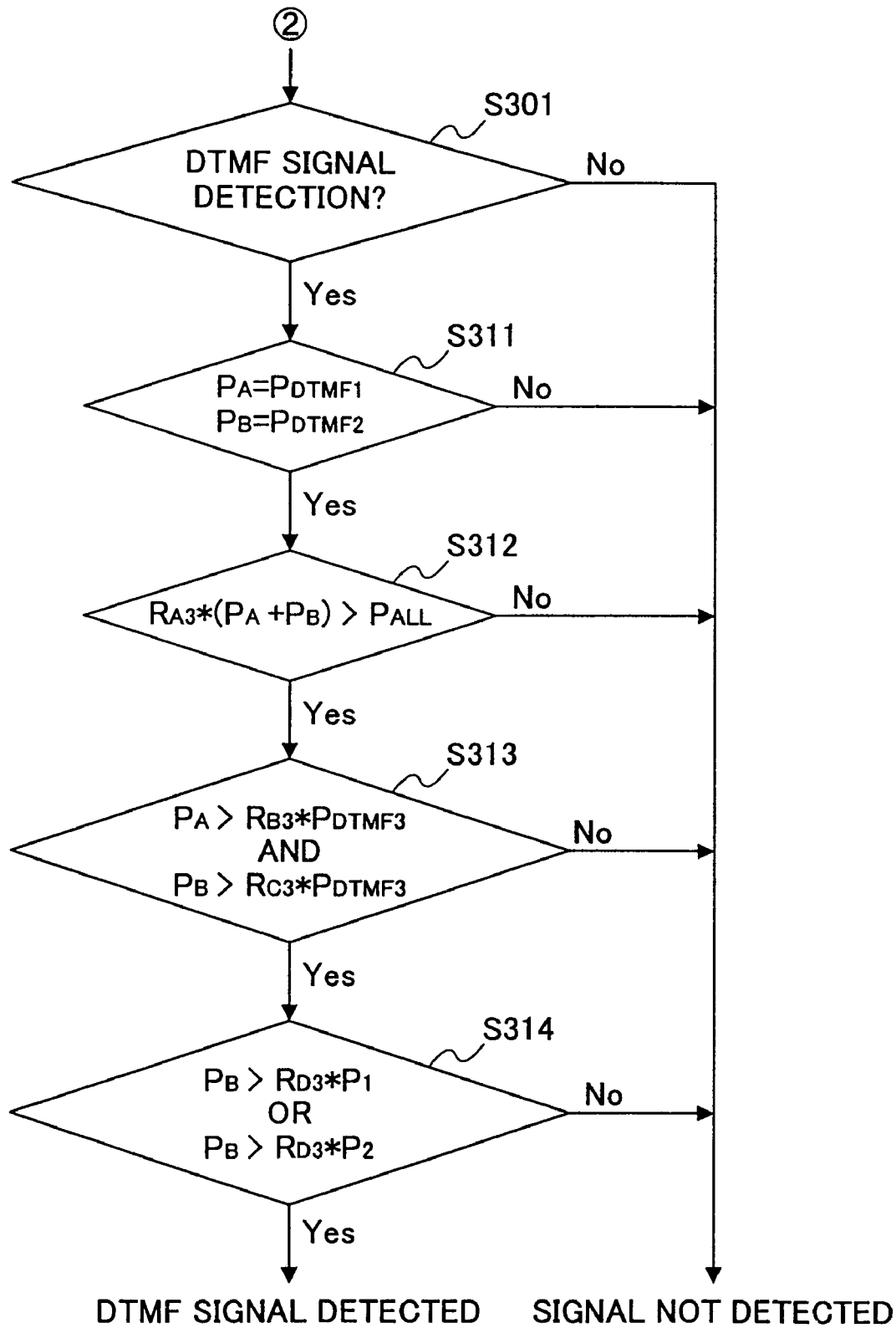

TONE DETECTOR JUDGING A DETECTION OF A PREDETERMINED TONE SIGNAL BY COMPARING A CHARACTERISTIC QUANTITY OF THE TONE SIGNAL WITH CHARACTERISTIC QUANTITIES OF OTHER SIGNALS

This is a divisional application of U.S. patent application Ser. No. 10/319,528, filed on Dec. 16, 2002, now U.S. Pat. No. 7,035,394 the entire disclosure of which is incorporated herein by reference.

BACKGROUND OF THE INVENTION

1. Field of the Invention

The present invention generally relates to a tone detector, and more particularly, to a tone detector transmitting a tone signal while performing an accurate tone detection without using a filter or consuming a cost.

2. Description of the Related Art

In a communication apparatus, such as a facsimile apparatus, a tone signal needs to be detected upon performing a communication, such as a transmission/reception of data. Further, there is a case where, while transmitting a tone signal (hereinafter referred to as a tone T), a different tone signal (hereinafter referred to as a tone R) having a different frequency needs to be detected. In this case, an echo signal of the transmitted tone T is returned due to various causes; thus, not only the tone R, but also the echo signal of the tone T, enter a detector detecting the tone R. This makes it difficult to detect the tone R. To solve this problem, influences of the echo signal need to be reduced or eliminated by removing the echo signal.

Conventionally, in general, a filter is used for removing the echo signal of the tone T. Specifically, a filter cutting the echo signal of the tone T is provided before the detector detecting the tone R so as to remove components of the echo signal of the tone T from input signals including the echo signal of the tone T and the tone R, or to reduce a level of the echo signal.

However, when the tone T and the tone R have approximate frequencies, a high-order filter sometimes needs to be used. Without such a high-order filter, components of the echo signal of the tone T cannot be removed sufficiently; this exposes the detector detecting the tone R under influences of the echo signal. Additionally, without such a high-order filter, not only the echo signal of the tone T, but also signal components of the tone R are removed so as to reduce a level of the tone R; this imposes negative effects on the detector detecting the tone R.

Consequently, a high-order filter is used in a conventional tone detector; however, preparing a high-order filter in the form of hardware necessitates the number of components to be increased, which leads to an increased cost. On the other hand, using a high-order filter in the form of software takes a long processing time due to numerous stages of the filter, which reduces a throughput of the tone detector as a whole.

Further, in a communication apparatus, such as a facsimile apparatus, a DTMF signal and various types of tone signals need to be detected. In one case, one type of tone signal (hereinafter referred to as single tone) is detected; in another case, two types of tone signals (hereinafter referred to as dual tone) are detected simultaneously.

Conventionally, these tone signals are detected by detectors specialized for individual usage, such as a detector used for the DTMF signal, a detector used for the single tone, and a detector used for the dual tone.

However, since the above-mentioned conventional detectors are specialized for individual usage, preparing the conventional detectors in the form of hardware takes a high cost, or leads to an increase in the number of components. Alternatively, preparing the conventional detectors in the form of software necessitates different processes to be provided for each of the detectors, which leads to a long processing time; accordingly, processors, such as a CPU, cannot spare computing powers for processes necessary for other communications, suffering lack of powers.

SUMMARY OF THE INVENTION

It is a general object of the present invention to provide an improved and useful tone detector in which the above-mentioned problems are eliminated.

A more specific object of the present invention is to provide a tone detector capable of performing a tone detection while transmitting a tone signal, without using a filter involving various problems.

Another specific object of the present invention is to provide a tone detector capable of performing accurate single-tone/dual-tone/DTMF detection at a low cost by obtaining a power spectrum for each frequency of the tones and comparing magnitudes of the power spectra white processing each tone of the DTMF signal, and the single/dual tones on the same basis without performing different processes for the tones to be detected.

In order to achieve the above-mentioned objects, there is provided according to one aspect of the present invention a tone detector including a tone transmission part transmitting a tone signal, a signal reception part receiving externally supplied signals, a tone signal detection part detecting data representing tone signals from the received signals, and a tone judgment part judging a detection of a predetermined tone signal according to the data, wherein the tone signal detection part detects data representing tone signals of all of the received signals, detects data representing an echo signal of the tone signal transmitted by the tone transmission part, and detects data representing the predetermined tone signal, and the tone judgment part excludes the data representing the echo signal from the data representing the tone signals of all of the received signals so as to judge the detection of the predetermined tone signal.

According to the present invention, the detection of the predetermined tone signal, which is targeted to be detected, is judged by excluding the data obtained in the detection process of the echo signal of the outgoing transmitted signal from the data obtained in the detection process of all of the received-signals. This eliminates or reduces influences of the echo signal impeding the detection processes. Thus, an accurate and precise tone detection can be performed.

Additionally, in the tone detector according to the present invention, the tone judgment part may judge the detection of the predetermined tone signal when the data representing the predetermined tone signal exists at least in a predetermined proportion in comparison with data obtained by excluding the data representing the echo signal from the data representing the tone signals of all of the received signals.

According to the present invention, even when the received signals include disturbances, such as noises, the foregoing proportion may be varied so as to adjust severity in judging the detection of the predetermined tone signal. Therefore, an accurate and precise tone detection can be performed.

Additionally, in the tone detector according to the present invention, the tone signal detection part may extract a predetermined characteristic quantity of the tone signal as the data representing the tone signal, and supply the tone judgment part with the characteristic quantity as the data.

According to the present invention, tone signals having different characteristic quantities can be detected.

Additionally, in the tone detector according to the present invention, the tone signal detection part may extract a quantity regarding a frequency as the characteristic quantity.

Additionally, in the tone detector according to the present invention, the tone signal detection part may extract a quantity regarding an amplitude as the characteristic quantity.

Additionally, in the tone detector according to the present invention, the tone signal detection part may extract a quantity regarding a phase as the characteristic quantity.

According to the present invention, tone signals having different or characteristic frequencies, amplitudes, or phases can be detected.

Additionally, in the tone detector according to the present invention, the tone signal detection part may extract a power level of a frequency component as the quantity regarding the frequency.

According to the present invention, tone signals can be detected by performing calculation and comparison processes using the power level of the frequency components.

Additionally, in the tone detector according to the present invention, the tone signal detection part may obtain the power level of the frequency component by a DFT operation.

According to the present invention, it becomes possible to obtain the power level only in a frequency band to be detected so that tone signals can be detected accurately.

Additionally, in the tone detector according to the present invention, the tone signal detection part may obtain the power level of the frequency component by an FFT operation.

According to the present invention, the power level can be obtained most accurately with respect to steady data having a long data length; thus, tone signals can be detected accurately.

Additionally, in the tone detector according to the present invention, the tone signal detection part may obtain the power level of the frequency component by a maximum entropy method.

According to the present invention, upon obtaining a power level from only a small part of infinite series of signals or phenomena, a resolution becomes higher for input data than resolutions obtained by other methods; thus, tone signals can be detected accurately.

Additionally, in the tone detector according to the present invention, the tone signal detection part may obtain the power level of the frequency component by a wavelet transform.

According to the present invention, a frequency resolution becomes high in a low frequency area; thus, tone signals can be detected accurately in a low frequency area.

Additionally, in the tone detector according to the present invention, the tone signal detection part obtains the power level of the frequency component by a Wigner distribution.

According to the present invention, both a time resolution and a frequency resolution become high so that tone signals can be detected accurately.

In order to achieve the above-mentioned objects, there is also provided according to another aspect of the present invention a tone detector including a plurality of tone signal detection parts detecting respective tone signals by extracting predetermined characteristic quantities of the tone signals including the characteristic quantity of a single tone to be detected, and a tone judgment part judging that the single tone is detected when the characteristic quantity of the single tone is a largest characteristic quantity among the characteristic quantities detected by the tone signal detection parts.

According to the present invention, the single tone is judged to be detected when the tone signal detection part detecting the characteristic quantity of the single tone detects the largest characteristic quantity among the characteristic quantities detected by the tone signal detection parts. Accordingly, the single tone can be detected only when the single tone is the largest tone among received signals. Thus, the tone signal detection parts having equivalent functions enable an accurate single tone detection.

In order to achieve the above-mentioned objects, there is also provided according to another aspect of the present invention a tone detector including a plurality of tone signal detection parts detecting respective tone signals by extracting predetermined characteristic quantities of the tone signals including the characteristic quantity of a single tone to be detected, and a tone judgment part judging that the single tone is detected when the characteristic quantity of the single tone accounts for at least a predetermined proportion in the characteristic quantities detected by the tone signal detection parts.

According to the present invention, the single tone is judged to be detected when the characteristic quantity of the single tone accounts for the predetermined proportion or more in the characteristic quantities of received signals. Accordingly, the single tone can be detected only when a frequency component of the single tone exists in the received signals. Thus, the tone signal detection parts having equivalent functions enable an accurate single tone detection.

In order to achieve the above-mentioned objects, there is also provided according to another aspect of the present invention a tone detector including a plurality of tone signal detection parts detecting respective tone signals by extracting predetermined characteristic quantities of the tone signals including the characteristic quantity of a single tone to be detected, and a tone judgment part judging that the single tone is detected when the characteristic quantity of the single tone is larger by, at least a predetermined rate than a second largest characteristic quantity among the characteristic quantities detected by the tone signal detection parts.

According to the present invention, the single tone can be detected only when a frequency component of the single tone is prominent in received signals. Thus, the tone signal detection parts having equivalent functions enable an accurate single tone detection.

In order to achieve the above-mentioned objects, there is also provided according to another aspect of the present invention a tone detector including a tone signal detection part detecting a tone signal by extracting a predetermined characteristic quantity of a single tone to be detected, a DTMF signal detection part detecting a DTMF signal by extracting the characteristic quantities of the DTMF signal, and a tone judgment part judging that the single tone is detected when the characteristic quantity of the single tone is larger by at least a predetermined rate than a largest characteristic quantity among the characteristic quantities of the DTMF signal.

According to the present invention, the DTMF signal can be prevented from being detected erroneously as the single tone. Thus, the tone signal detection parts having equivalent functions enable an accurate single tone detection.

In order to achieve the above-mentioned objects, there is also provided according to another aspect of the present invention a tone-detector including a plurality of tone signal detection parts detecting respective tone signals by extracting predetermined characteristic quantities of the tone signals including the characteristic quantities of a dual tone to be detected, and a tone judgment part judging that the dual tone is detected when the characteristic quantities of the dual tone are a largest characteristic quantity and a second largest characteristic quantity among the characteristic quantities detected by the tone signal detection parts.

According to the present invention, the dual tone is judged to be detected when the tone signal detection parts detecting the characteristic quantities of the dual tone detect the largest and the second largest characteristic quantities among the characteristic quantities detected by the tone signal detection parts. Accordingly, the dual tone can be detected only when the dual tone is the largest tone among received signals. Thus, the tone signal detection parts having-equivalent functions enable an accurate dual tone detection.

In order to achieve the above-mentioned objects, there is also provided according to another aspect of the present invention a tone detector including a plurality of tone signal detection parts detecting respective tone signals by extracting predetermined characteristic quantities of the tone signals including the characteristic quantities at a lower frequency and a higher frequency of a dual tone to be detected, and a tone judgment part judging that the dual tone is detected when the characteristic quantities of the dual tone account for at least a predetermined proportion in the characteristic quantities detected by the tone signal detection parts.

According to the present invention, the dual tone is judged to be detected when the characteristic quantities at the lower and higher frequencies of the dual tone account for the predetermined proportion or more in the characteristic quantities of received signals. Accordingly, the dual tone can be detected only when frequency components of the dual tone exist in the received signals. Thus, the tone signal detection parts having equivalent functions enable an accurate dual tone detection.

In order to achieve the above-mentioned objects, there is also provided according to another aspect of the present invention a tone detector including a plurality of tone signal detection parts detecting respective tone signals by extracting predetermined characteristic quantities of the tone signals including the characteristic quantities at a lower frequency and a higher frequency of a dual tone to be detected, and a tone judgment part judging that the dual tone is detected when each of the characteristic quantities of the dual tone is larger by at least a predetermined rate than a third largest characteristic quantity among the characteristic quantities detected by the tone signal detection parts.

According to the present invention, the dual tone can be detected only when frequency components of the dual tone are prominent in received signals. Thus, the tone signal detection parts having equivalent functions enable an accurate dual tone detection.

In order to achieve the above-mentioned objects, there is also provided according to another aspect of the present invention a tone detector including a plurality of tone signal detection parts detecting respective tone signals by extracting predetermined characteristic quantities of a dual tone to be detected, a DTMF signal detection-part detecting a DTMF signal by extracting the characteristic quantities' of the DTMF signal, and a tone judgment part judging that the dual tone is detected when a second largest characteristic quantity of the characteristic quantities of the dual tone is larger by at least a predetermined rate than a largest characteristic quantity among the characteristic quantities of the DTMF signal.

According to the present invention, the DTMF signal can be prevented from being detected erroneously as the dual tone. Thus, the tone signal detection parts having equivalent functions enable at accurate dual tone detection.

In order to achieve the above-mentioned objects, there is also provided according to another aspect of the present invention a tone detector including a plurality of tone signal detection parts detecting respective tone signals by extracting predetermined characteristic quantities of the tone signals including the characteristic quantities of a DTMF signal to be detected, and a tone judgment part judging that the DTMF signal is detected when the characteristic quantities at a lower frequency and a higher frequency of the DTMF signal are a largest characteristic quantity and a second largest characteristic quantity among the characteristic quantities detected by the tone signal detection parts.

According to the present invention, the DTMF signal is judged to be detected when the tone signal detection parts detecting the characteristic quantities of the DTMF signal detect the largest and the second largest characteristic quantities among the characteristic quantities detected by the tone signal detection parts. Accordingly, the DTMF signal can be detected only when the DTMF signal is the largest signal among received signals. Thus, the tone signal detection parts having equivalent functions enable an accurate DTMF signal detection.

In order to achieve the above-mentioned objects, there is also provided according to another aspect of the present invention a tone detector including a plurality of tone signal detection parts detecting respective tone signals by extracting predetermined characteristic quantities of the tone signals including the characteristic quantities of a DTMF signal to be detected, and a tone judgment part judging that the DTMF signal is detected when the characteristic quantities at a lower frequency and a higher frequency of the DTMF signal account for at least a predetermined proportion in the characteristic quantities detected by the tone signal detection parts.

According to the present invention, the DTMF signal is judged to be detected when the characteristic quantities at the lower and higher frequencies of the DTMF signal account for the predetermined proportion or more in the characteristic quantities of received signals. Accordingly, the DTMF signal can be detected only when frequency components of the DTMF signal exist in the received signals. Thus, the tone signal detection parts having equivalent functions enable an accurate DTMF signal detection.

In order to achieve the above-mentioned objects, there is also provided according to another aspect of the present invention a tone detector including a plurality of tone signal detection parts detecting respective tone signals by extracting predetermined characteristic quantities of the tone signals including the characteristic quantities of a DTMF signal to be detected, and a tone judgment part judging that the DTMF signal is detected when each of the characteristic quantities at a lower frequency and a higher frequency of the DTMF signal is larger by at least a predetermined rate than a third largest characteristic quantity among the characteristic quantities detected by the tone signal detection parts.

According to the present invention, the DTMF signal can be detected only when frequency components of the DTMF signal are prominent in received signals. Thus, the tone signal detection parts having equivalent functions enable an accurate DTMF signal detection.

In order to achieve the above-mentioned objects, there is also provided according to another aspect of the present invention a tone detector including a plurality of DTMF signal detection parts detecting a DTMF signal to be detected by extracting predetermined characteristic quantities of the DTMF signal, a single/dual tone signal detection part detecting at least one of single and dual tone signals by extracting the characteristic quantities of the single and dual tone signals, and a tone judgment part judging that the DTMF signal is detected when a second largest characteristic quantity of the characteristic quantities of the DTMF signal is larger by at least a predetermined rate than a largest characteristic quantity among the characteristic quantities of the single and dual tone signals.

According to the present invention, the single/dual tone signal can be prevented from being detected erroneously as the DTMF signal. Thus, the tone signal detection parts having equivalent functions enable an accurate DTMF signal detection.

Other objects, features and advantages of the present invention will become more apparent from the following detailed description when read in conjunction with the accompanying drawings.

BRIEF DESCRIPTION OF THE DRAWINGS

FIG. 21 is a third flowchart of the signal detection judgment process according to the second embodiment of the present invention.

DETAILED DESCRIPTION OF THE PREFERRED EMBODIMENTS

A description will now be given, with reference to the drawings, of embodiments according to the present invention.

First, a description will be given of a principle of operation of a tone detector according to a first embodiment of the present invention, by taking an example involving two signals. In this example, while transmitting one tone signal, the other tone signal having a different frequency from a frequency of the former signal is detected.

First, two detectors are prepared: one detector used for one tone signal (hereinafter referred to as a tone T), and the other detector used for a different tone signal (hereinafter referred to as a tone R). At this point, the number of detectors does not always have to be two; the number of detectors may be any number equal to or larger than a total number of transmitted tone signals and detected tone signals. For example, in a case of detecting a single tone while transmitting a dual tone, at least three detectors are necessary.

Each of the detectors is provided with a setting of a frequency to be detected. The detector obtains a power spectrum of components of the above-mentioned frequency, and compares the power spectrum with power spectra of all of input signals. When the obtained power spectrum exists in the power spectra of all of the input signals to an amount equal to or larger than a predetermined amount, the detector determines that the frequency component exists, and thus judges that a signal to be detected exists in the input signals. In this detection (judgment) operation, a power in a frequency domain of a signal is used as a characteristic quantity of the signal to be detected; however, other characteristic quantities in an amplitude domain or a phase domain may be used, as long as the quantities characterize the signal to be detected. Additionally, in the above-described detection operation, the detector judges that the signal to be detected exists in the input signals when the obtained power spectrum exists in the power spectra of all of the input signals to an amount equal to or larger than the predetermined amount; however, a predetermined proportion may replace the predetermined amount. Further, the power spectrum may be obtained by various methods, for example, by a general FFT operation in the above-described detection operation.

Next, the detector (hereinafter referred to as detector T) used for the tone T is provided with a setting for detecting a frequency of the tone T, and the detector (hereinafter referred to as detector R) used for the tone R is provided with a setting for detecting a frequency of the tone R. Then, the detectors T and R are brought into operation. When the detector T is brought into operation, the detector T obtains a power spectrum of an echo signal of the tone T, and the detector R obtains a power spectrum of the tone R.

Figure 1:
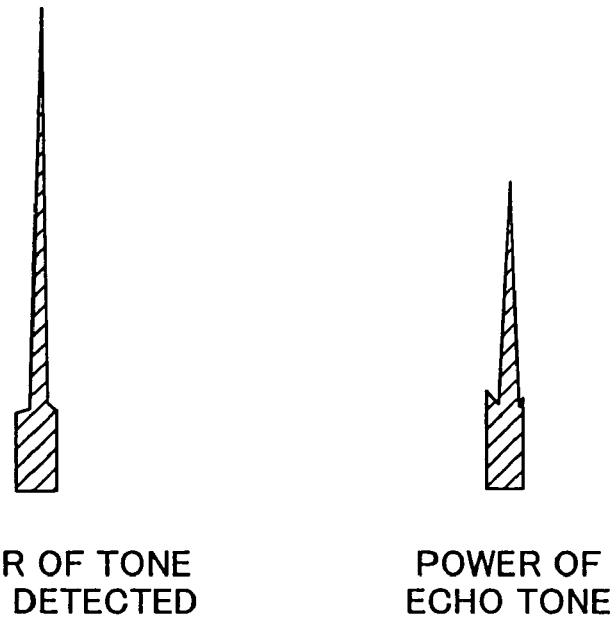
FIG. 1 shows frequency distributions of power spectra of a tone to be detected and an echo tone each obtained by a tone detector according to the present invention.
Figure 2:
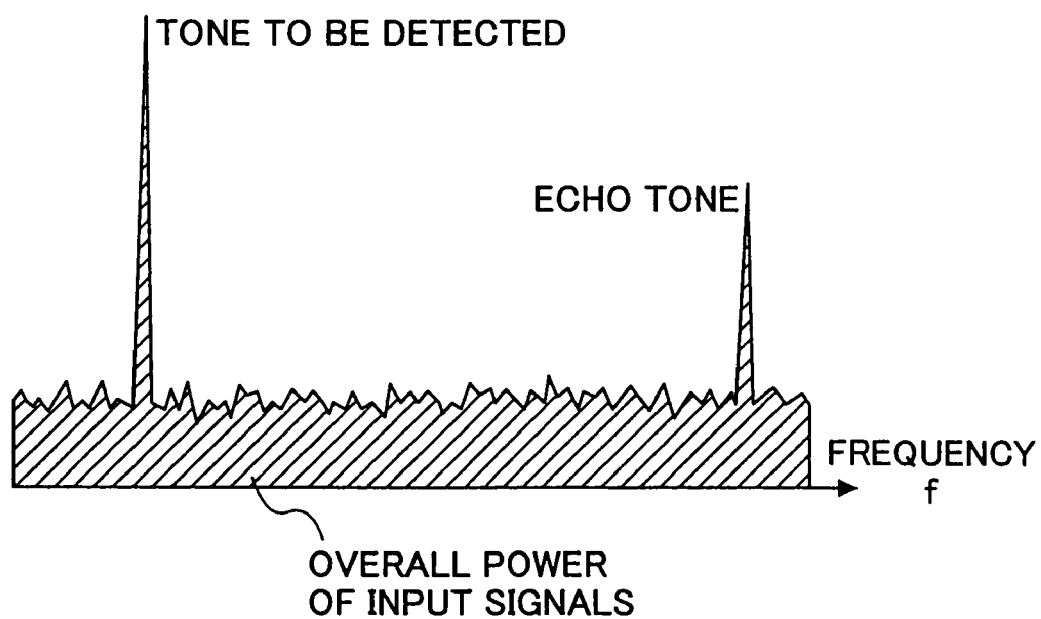
FIG. 2 shows a frequency distribution of power spectra of all of input signals which are obtained by the tone detector according to the present invention.

FIG. 1 shows the power spectrum of the tone to be detected (the tone R) and the power spectrum of the echo tone (the echo signal of the tone T). FIG. 2 shows the power spectra of all of the input signals.

To perform the detection judgment, the detector simultaneously obtains the power spectra of all of the input signals, and excludes therefrom the power spectrum of the echo signal of the tone T obtained by the detector T so as to obtain power spectra of the input signals except the echo signal of the tone T.

Figure 3:
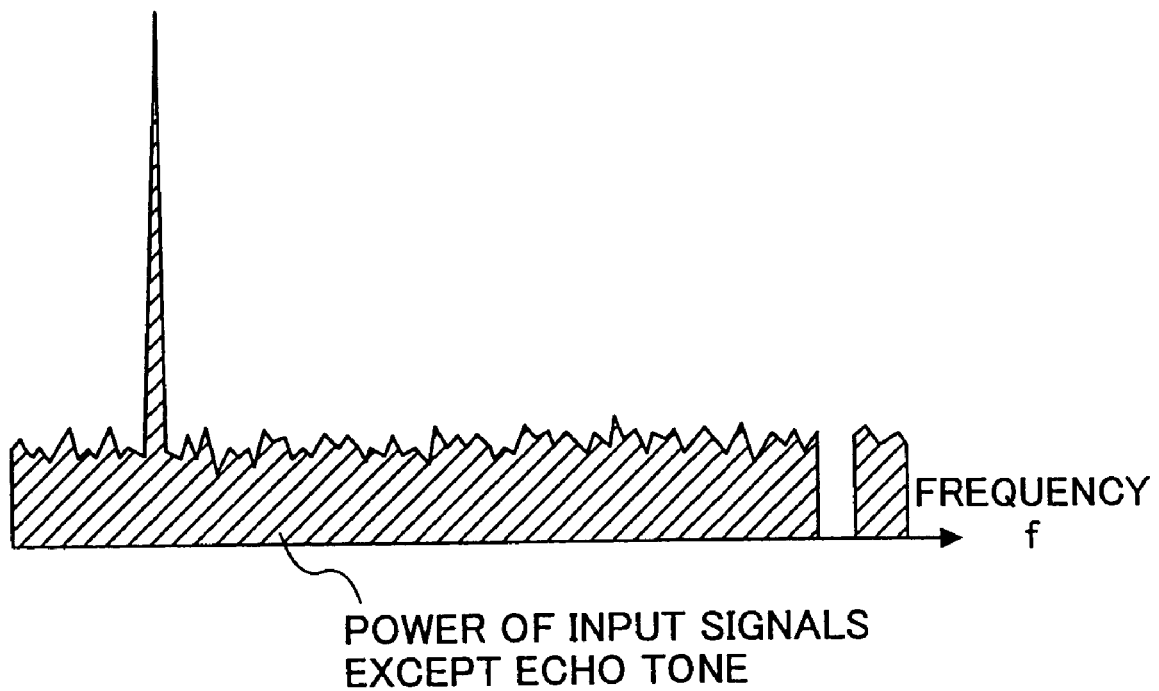
FIG. 3 shows a frequency distribution of input waveforms excluding the echo tone which are obtained by the tone detector according to the present invention.

FIG. 3 shows the power spectra of the input signals except the echo tone (the echo signal of the tone T), i.e., shows a frequency distribution of input waveforms excluding the echo tone.

When the power spectra of the input signals excluding the echo signal of the tone T include the power spectrum of the tone R to a predetermined amount or proportion at least, the detector determines that the input signals include a signal having components of the tone R, and thus judges that the tone R is detected. On the other hand when the power spectra of the input signals excluding the echo signal of the tone T do not include the power spectrum of the tone R to the predetermined amount or proportion, the detector judges that the tone R is not detected in the input signals.

By performing this detection process at predetermined time intervals, detection results can be obtained in time series. Accordingly, the heretofore-described tone detection can be performed with respect to successively input signals.

Figure 4:
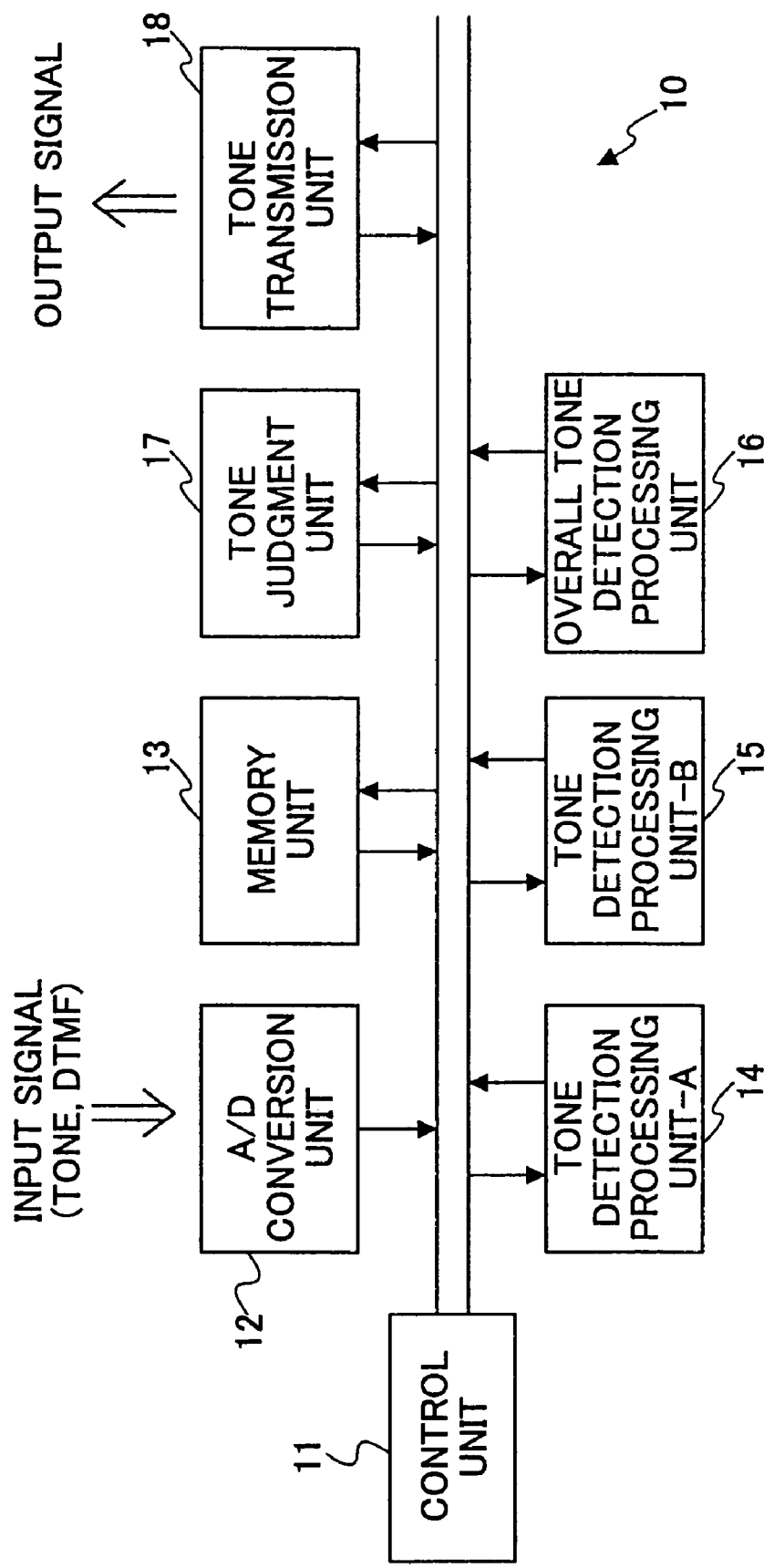
FIG. 4 is a block diagram of a first embodiment of the tone detector according to the present invention.

FIG. 4 is a block diagram of the tone detector according to the first embodiment of the present invention. In this example, while transmitting the tone signal (T) having one frequency, the detector detects the tone signal (R) having a frequency different from the frequency of the tone signal T, as described above.

As shown in FIG. 4, a tone detector 10 comprises a control unit 11, an A/D conversion unit 12, a memory unit 13, a tone detection processing unit-A 14, a tone detection processing unit-B 15, an overall tone detection processing unit 16, a tone judgment unit 17 and a tone transmission unit 18.

The control unit 11 controls the tone detector 10 as a whole. The A/D conversion unit 12 converts an analog tone signal into digital data. The memory unit 13 stores the digital signal data, or results of the detection process. The tone detection processing unit-A 14 performs a power-spectrum calculation for the tone T. The tone detection processing unit-B 15 performs a power-spectrum calculation for the tone R. The overall tone detection processing unit 16 performs a power-spectrum calculation for an input signal as a whole. The tone judgment unit 17 judges a tone detection. The tone transmission unit 18 transmits the tone T.

First, the control unit 11 orders the tone transmission unit 18 to transmit the tone T having a predetermined frequency. Then, the tone transmission unit 18 transmits the tone T to a communication line. In this state, a tone signal is received from the communication line. The received tone signal is sampled by the A/D conversion unit 12, and is converted into digital signal data. The digital signal data is successively stored in the memory unit 13. At least the A/D conversion unit 12 forms a signal reception part.

After a predetermined time elapses when a predetermined amount of the data is stored in the memory unit 13, the control unit 11 transfers the digital signal data to the tone detection processing unit-A 14 provided with a setting for detecting the frequency of the tone T, and causes the tone detection processing unit-A 14 to perform a detection process for obtaining a power spectrum at the frequency of the tone T. Additionally, the control unit 11 transfers the same digital signal data to the tone detection processing unit-B 15 provided with a setting for detecting the frequency of the tone R, and causes the tone detection processing unit-B 15 to perform a detection process for obtaining a power spectrum at the frequency of the tone R. Further, the control unit 11 transfers the same digital signal data to the overall tone detection processing-unit 16, and causes the overall tone detection processing unit 16 to perform a detection process for obtaining an overall power spectrum of the signal supplied to the A/D conversion unit 12. In this example, each of the tone detection processing units 14, 15 and 16 obtains the power spectrum by a DFT (Discrete Fourier Transform) operation; however, the DFT operation may be replaced by other methods, such as a maximum entropy method, an FFT (Fast Fourier Transform) operation, a wavelet transform and a Wigner distribution. The tone detection processing units 14, 15 and 16 form a tone signal detection part.

Upon completion of the detection process, each of the tone detection processing unit-A 14, the tone detection processing unit-B 15 and the overall tone detection processing unit 16 informs the control unit 11 of the completion. When all of the tone detection processing unit-A 14, the tone detection processing unit-B 15 and the overall tone detection processing unit 16 finish the respective detection processes, the control unit 11 orders the tone detection processing unit-A 14, the tone detection processing unit-B 15 and the overall tone detection processing unit 16 to transmit the respectively obtained power levels (the power spectra) to the tone judgment unit 17. Upon receiving all of the power levels from the tone detection processing unit-A 14, the tone detection processing unit-B 15 and the overall tone detection processing unit 16, the tone judgment unit 17 starts a judgment process.

In the judgment process, first, the tone judgment unit 17 excludes the power level at the frequency of the tone T transmitted from the tone detection processing unit-A 14, i.e., the power level of the echo signal of the tone T from the overall power level of the input signal transmitted from the overall tone detection processing unit 16. The power level obtained by the DFT operation can be excluded simply by a subtracting process.

Next, the tone judgment unit 17 compares the power level excepting the power level at the frequency of the tone T with the power level at the frequency of the tone R transmitted from the tone detection processing unit-B 15 so as to examine whether or not the power level at the frequency of the tone R exists in a predetermined proportion at least. When the power level at the frequency of the tone R exists in the predetermined proportion at least, the tone judgment unit 17 determines that a frequency component of the tone R exists in the input signal, and thus judges that the tone R is detected. Conversely, when the power level at the frequency of the tone R does not exist in the predetermined proportion, the tone judgment unit 17 determines that a frequency component of the tone R does not exist in the input signal, and thus judges that the tone R is not detected. The tone judgment unit 17 informs the control unit 11 of this detection result, completing the series of the tone detection processes.

Figure 5:
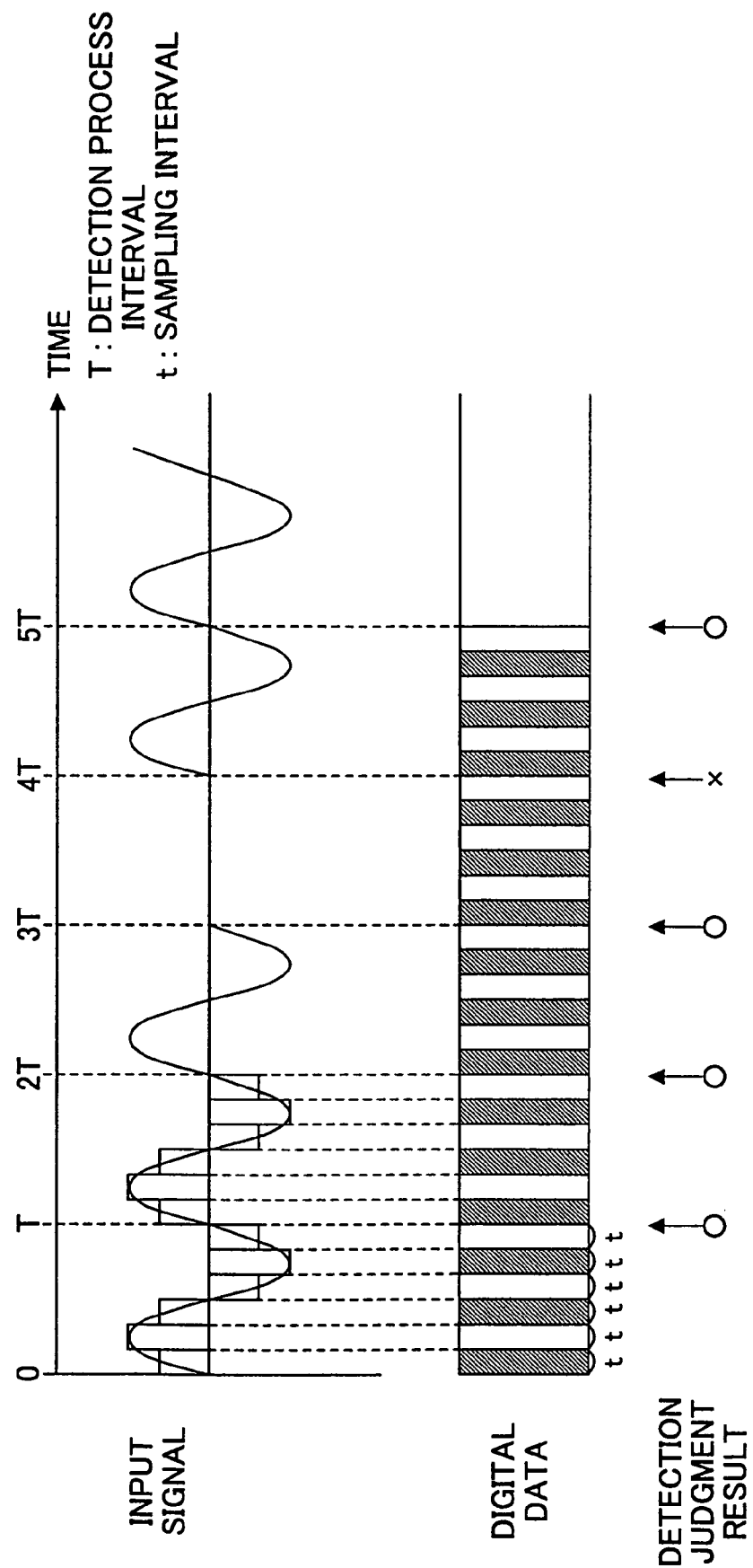
FIG. 5 shows a timing of performing a tone/signal detection process according to the present invention.

As shown in FIG. 5, by performing the above-described detection process at a predetermined time interval T with respect to data items sampled at predetermined sampling intervals t, detection results can be obtained at the time intervals T. Accordingly, with respect to successively input signals, detection results can be obtained in time series, and thus, the tone detection can be performed.

Figure 6:
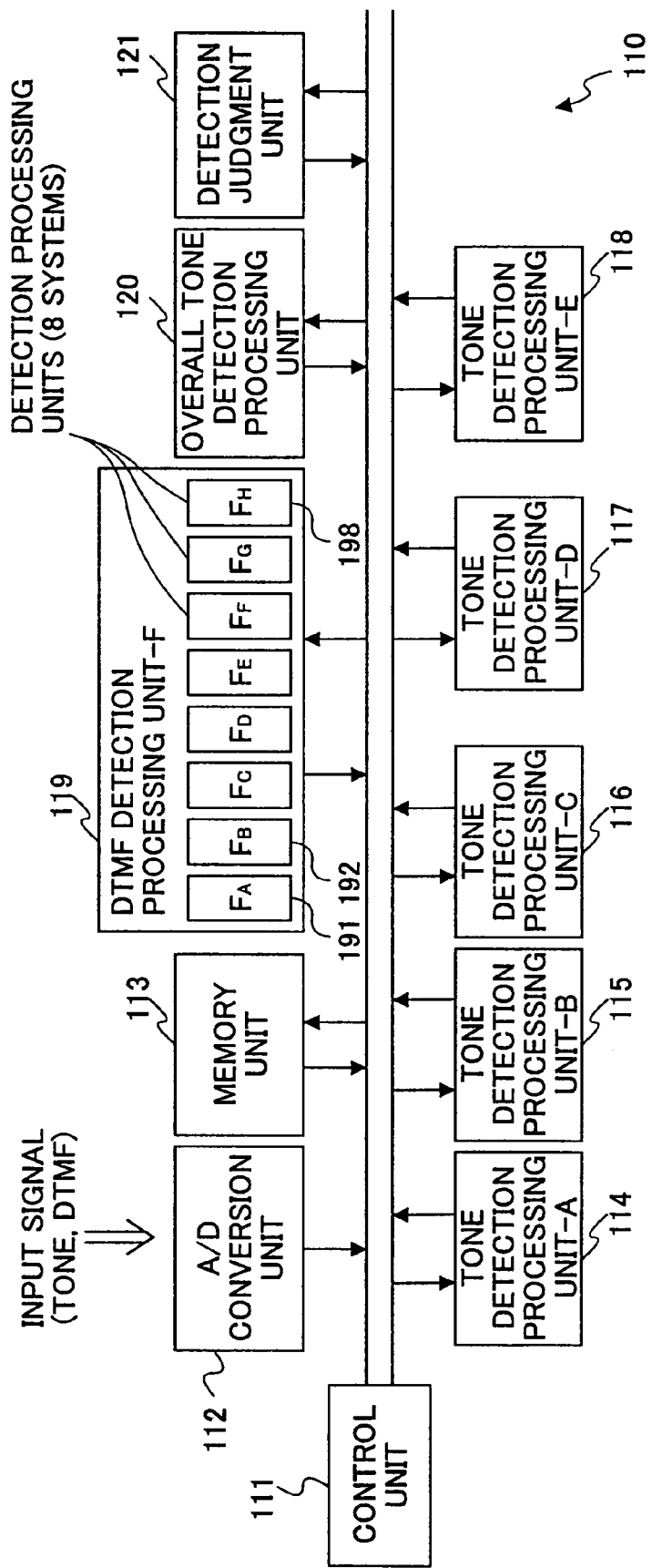
FIG. 6 is a block diagram of a second embodiment of the tone detector according to the present invention.

FIG. 6 is a block diagram of a tone detector according to a second embodiment of the present invention.

As shown in FIG. 6, there are provided five systems of single tone detection units (i.e., tone signal detection parts; a dual tone detection can also be performed by using two systems of the single tone detection units) and one system of a DTMF detection unit (a DTMF detection can also be performed by using eight systems of detection units each having the same structure as the single tone detection unit; the eight systems are arranged into one system in FIG. 6 for convenience' sake). At this point, the number of the single tone detection units does not always have to be five; the number of the single tone detection units may be any number equal to a number of frequencies to be detected at the same time; accordingly, the number of the single tone detection units may be smaller or larger than five; however, at least one system is necessary for a single tone detection, and at least two systems are necessary for the dual tone detection.

As shown in FIG. 6, a tone detector 110 comprises a control unit 111, an A/D conversion unit 112, a memory unit 113, a detection processing unit-A 114, a detection processing unit-B 115, a detection processing unit-C 116, a detection processing unit-D 117, a detection processing unit-E 118, a DTMF detection processing unit-F 119, an overall tone detection processing unit 120, and a detection judgment unit (a tone judgment unit) 121.

The control unit 111 controls the tone detector 110 as a whole. The A/D conversion unit 112 converts a tone signal into digital data. The memory unit 113 stores the digital signal data, or results of a detection process. Each of the detection processing units 114 to 118 performs a power-spectrum calculation for a single (or dual) tone. The DTMF detection processing unit-F 119 performs a power-spectrum calculation for eight frequencies of a DTMF signal. The overall tone detection processing unit 120 performs a power-spectrum calculation for input signals as a whole. The detection judgment unit 121 judges a tone detection.

Prior to giving a description of operations of the tone detector 110 shown in FIG. 6, a description will be given of a principle of operation of a tone detection process according to the present second embodiment of the present invention.

First, power spectra at frequencies of various DTMF signals, a single tone signal and a dual tone signal, which are targeted to be detected, are obtained.

At this point, each of the power spectra may be obtained by means of hardware or software: for example, the power spectrum may be obtained by a DFT (Discrete Fourier Transform) operation in the form of software; alternatively, the DFT operation may be replaced by other methods, such as an FFT (Fast Fourier Transform) operation, a maximum entropy method, a wavelet transform and a Wigner distribution.

The powers obtained here include: a power $P_{ALL}$ of the received (input) signals as a whole; a power $P_S$ at a frequency of the single tone targeted to be detected; powers $P_{D1}$ and $P_{D2}$ at two frequencies of the dual tone targeted to be detected ($P_{D1} > P_{D2}$ in magnitude) and powers $P_A$ and $P_B$ at lower and higher frequencies of the DTMF signal targeted to be detected ($P_A > P_B$ in magnitude).

Besides, among powers at various frequencies of the DTMF signal, a largest power is assumed to be a power $P_{DTMF1}$, a second largest power is assumed to be a power $P_{DTMF2}$, and a third largest power is assumed to be a power $P_{DTMF3}$. Additionally, among powers of the single and dual tones, a largest power is assumed to be a power $P_1$, a second largest power is assumed to be a power $P_2$, and a third largest power is assumed to be a power $P_3$.

There are provided four detection conditions for detecting each of the single tone signal, the dual tone signal and the DTMF signal, as follows.

Additionally, when a signal targeted to be detected is known to be either of the single tone signal, the dual tone signal or the DTMF signal, or is known to be either of two of the single tone signal, the dual tone signal or the DTMF signal, only necessary detection conditions need to be considered. For example, when the signal targeted to be detected is a DTMF signal, only conditions 1-3, 2-3, 3-3 and 4-3 (hereinafter described as follows) need to be considered.

First, detection conditions for detecting the single tone signal include the following conditions 1-1, 2-1, 3-1 and 4-1.

[Condition 1-1]

When the single tone is a maximum tone (having the largest power), the power at the frequency of the single tone to be detected is the largest (i.e., first-place) power among powers detected by single/dual tone detectors (forming a single/dual tone signal detection part: the detection processing units 114 to 118).

That is, $[P_S = P_1]$ is satisfied.

Figure 7:
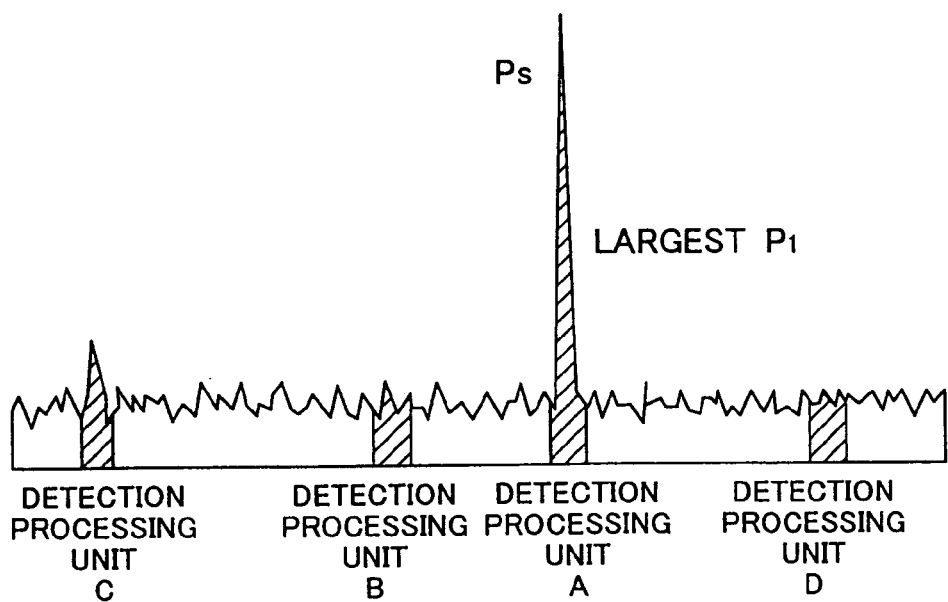
FIG. 7 illustrates a concept of one condition used in a single tone signal detection judgment according to the second embodiment of the present invention.

FIG. 7 illustrates a concept of the condition 1-1.

[Condition 2-1]

The power of the single tone accounts for a predetermined proportion or more in the power of the received signals.

That is, $[R_{A1} \times P_S > P_{ALL}]$ is satisfied, where $R_{A1}$ is a predetermined rate (constant).

Figure 8:
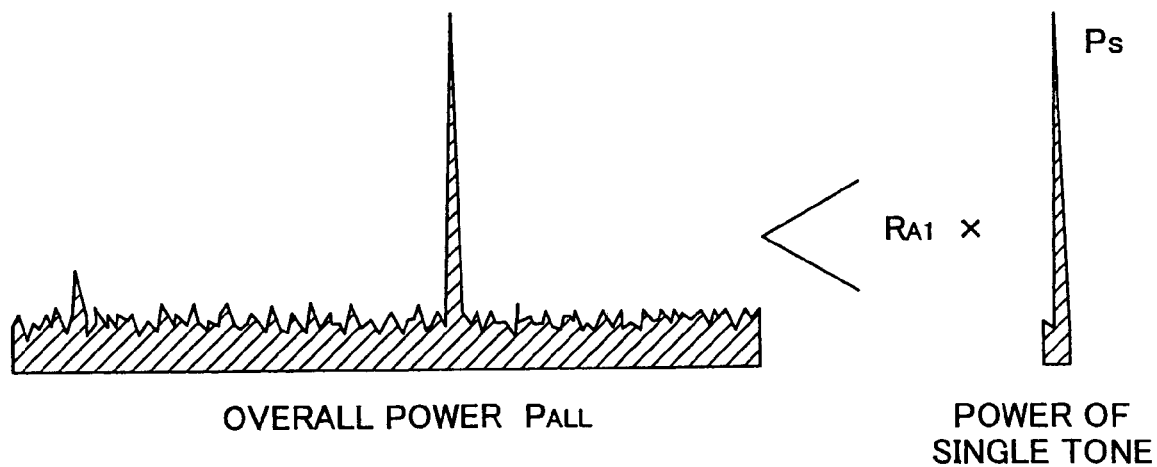
FIG. 8 illustrates a concept of one condition used in the single tone signal detection judgment according to the second embodiment of the present invention.

FIG. 8 illustrates a concept of the condition 2-1.

[Condition 3-1]

The maximum tone is prominent, i.e., the maximum tone is sufficiently larger than a second-place tone (having the second largest power).

That is, $[P_S > R_{B1} \times P_2]$ is satisfied, where $R_{B1}$ is a predetermined rate (constant).

Figure 9:
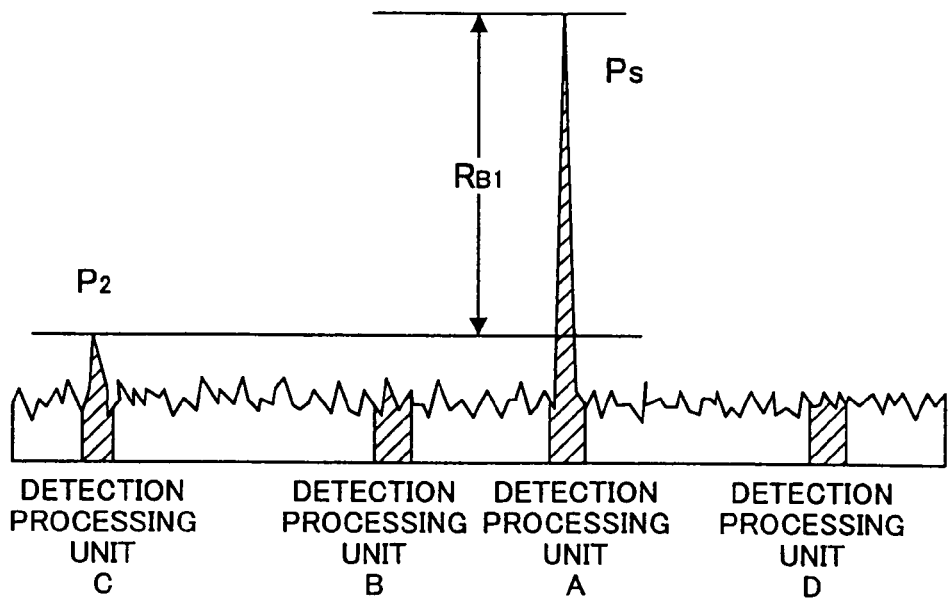
FIG. 9 illustrates a concept of one condition used in the single tone signal detection judgment according to the second embodiment of the present invention.

FIG. 9 illustrates a concept of the condition 3-1.

[Condition 4-1]

A signal detected as the single tone is sufficiently larger than the largest power among powers detected by DTMF detectors (the DTMF detection processing unit-F 119), or is sufficiently larger than the second largest (i.e., second-place) power when the DTMF detectors are influenced by the single tone.

That is, $[P_S > R_{C1} \times P_{DTMF1}]$ or $[P_S > R_{C1} \times P_{DTMF2}]$ is satisfied, where $R_{C1}$ is a predetermined rate (constant).

Figure 10:
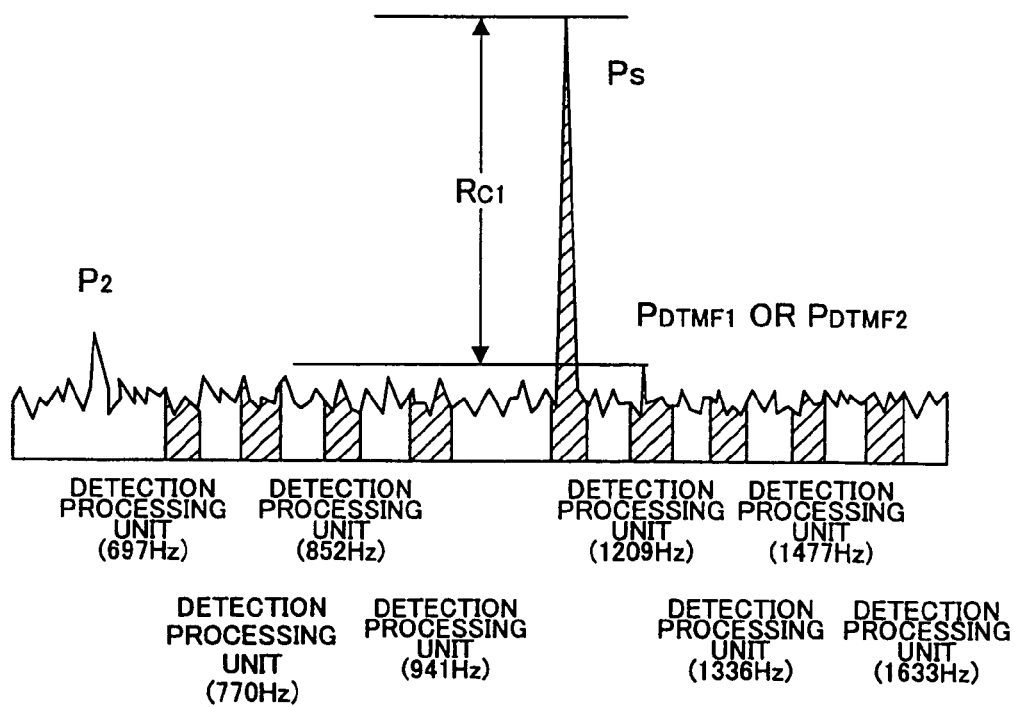
FIG. 10 illustrates a concept of one condition used in the single tone signal detection judgment according to the second embodiment of the present invention.

FIG. 10 illustrates a concept of the condition 4-1.

Next, detection conditions for detecting the dual tone signal include the following conditions 1-2, 2-2, 3-2 and 4-2.

[Condition 1-2]

When the maximum tone and the second-place tone form a pair of dual tones, the powers at the two frequencies of the dual tone to be detected are the largest and the second largest (i.e., first-place and second-place) powers among the powers detected by the single/dual tone detectors (the detection processing units 114 to 118).

That is, $[P_{D1} = P_1]$ and $[P_{D2} = P_2]$ are satisfied.

Figure 11:
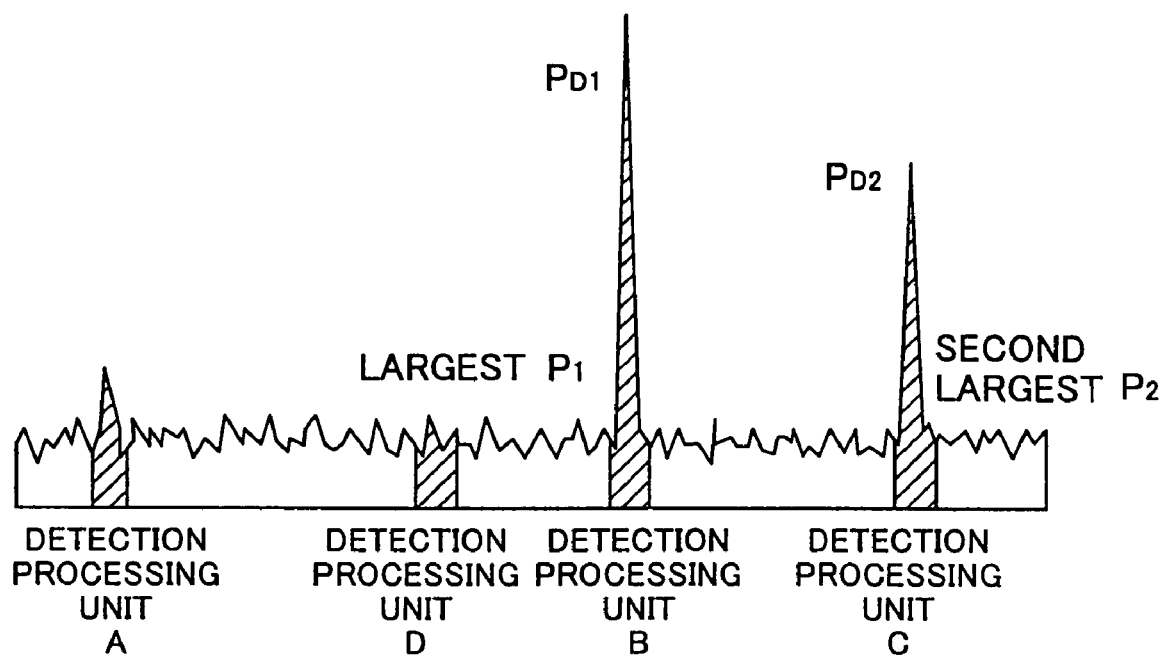
FIG. 11 illustrates a concept of one condition used in a dual tone signal detection judgment according to the second embodiment of the present invention.

FIG. 11 illustrates a concept of the condition 1-2.

[Condition 2-2]

The powers at the lower and higher frequencies of the dual tone account for a predetermined proportion or more in the power of the received signals.

That is, $[R_{A2} \times (P_{D1} + P_{D2}) > P_{ALL}]$ is satisfied, where $R_{A2}$ is a predetermined rate (constant).

Figure 12:
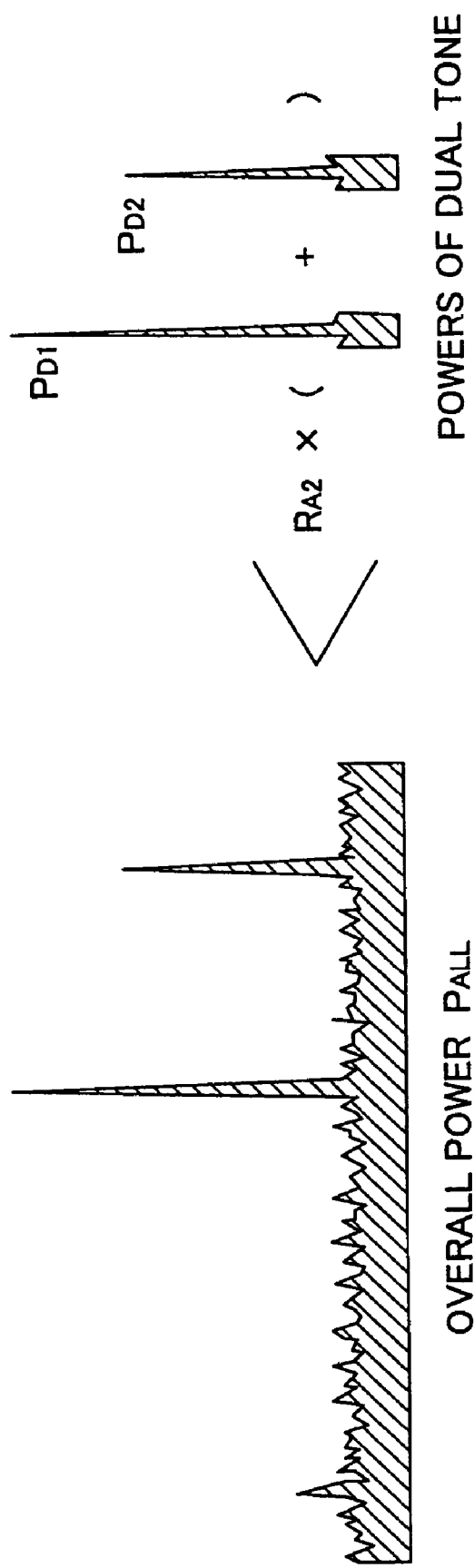
FIG. 12 illustrates a concept of one condition used in the dual tone signal detection judgment according to the second embodiment of the present invention.

FIG. 12 illustrates a concept of the condition 2-2.

[Condition 3-2]

Each of the powers at the two frequencies of the dual tone is considerably larger than the third largest (i.e., third-place) power among the powers detected by the single/dual tone detectors (the detection processing units 114 to 118).

That is, $[P_{D1} > R_{B2} \times P_3]$ and $[P_{D2} > R_{C2} \times P_3]$ are satisfied, where $R_{B2}$ and $R_{C2}$ are predetermined rates (constants)

Figure 13:
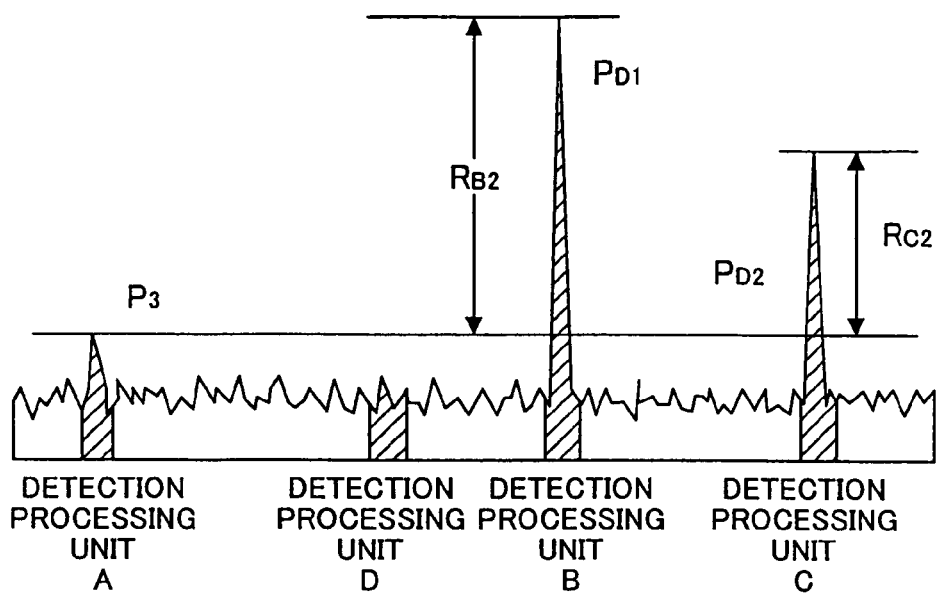
FIG. 13 illustrates a concept of one condition used in the dual tone signal detection judgment according to the second embodiment of the present invention.

FIG. 13 illustrates a concept of the condition 3-2.

[Condition 4-2]

The second-place tone element of the dual tone is sufficiently larger than the largest power among the powers detected by the DTMF detectors (the DTMF detection processing unit-F 119), or is sufficiently larger than the second largest (i.e., second-place) power when the DTMF detectors are influenced by the dual tone.

That is, $[P_{D2}>R_{D2}\times P_{DTMF1}]$ or $[P_{D2}>R_{D2}\times P_{DTMF2}]$ is satisfied, where $R_{D2}$ is a predetermined rate (constant)

Figure 14:
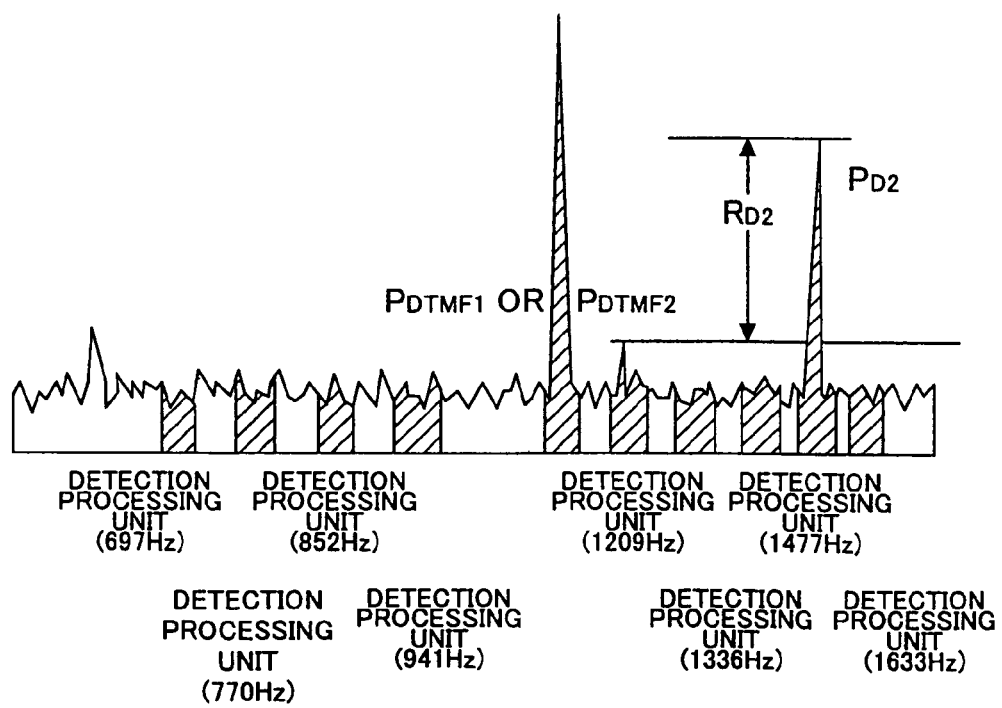
FIG. 14 illustrates a concept of one condition used in the dual tone signal detection judgment according to the second embodiment of the present invention.

FIG. 14 illustrates a concept of the condition 4-2.

Next, detection conditions for detecting the DTMF signal include the following conditions 1-3, 2-3, 3-3 and 4-3.

[Condition 1-3]

When the maximum tone and the second-place tone form a pair of lower and higher frequency tones of the DTMF signal, the powers at the lower and higher frequencies of the DTMF signal to be detected are the largest and the second largest (i.e., first-place and second-place) powers among the powers detected by the DTMF detectors (the DTMF detection processing unit-F 119).

That is, $[P_A=P_{DTMF1}]$ and $[P_B=P_{DTMF2}]$ are satisfied.

Figure 15:
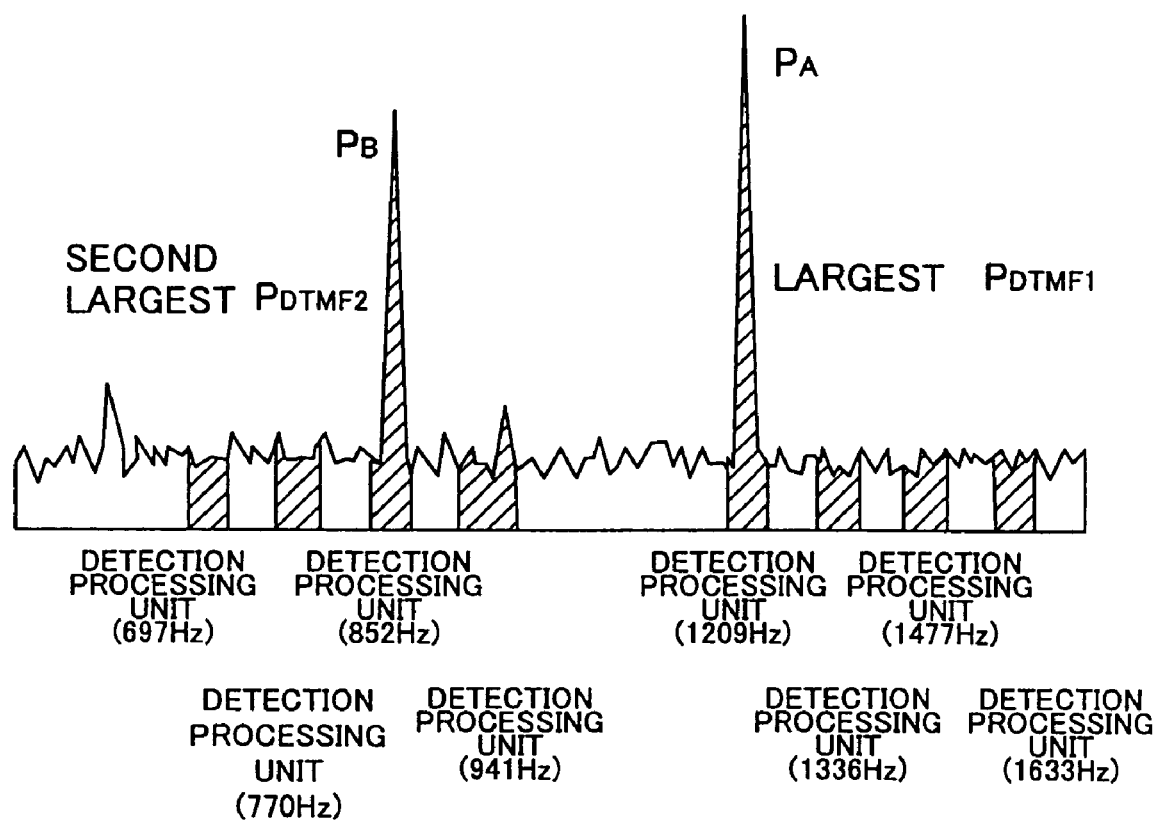
FIG. 15 illustrates a concept of one condition used in a DTMF signal detection judgment according to the second embodiment of the present invention.

FIG. 15 illustrates a concept of the condition 1-3.

[Condition 2-3]

Powers at a lower frequency and a higher frequency of the DTMF signal account for a predetermined proportion or more in the power of the received signals.

That is, $[R_{A3}\times(P_A+P_B)>P_{ALL}]$ is satisfied, where $R_{A3}$ is a predetermined rate (constant).

Figure 16:
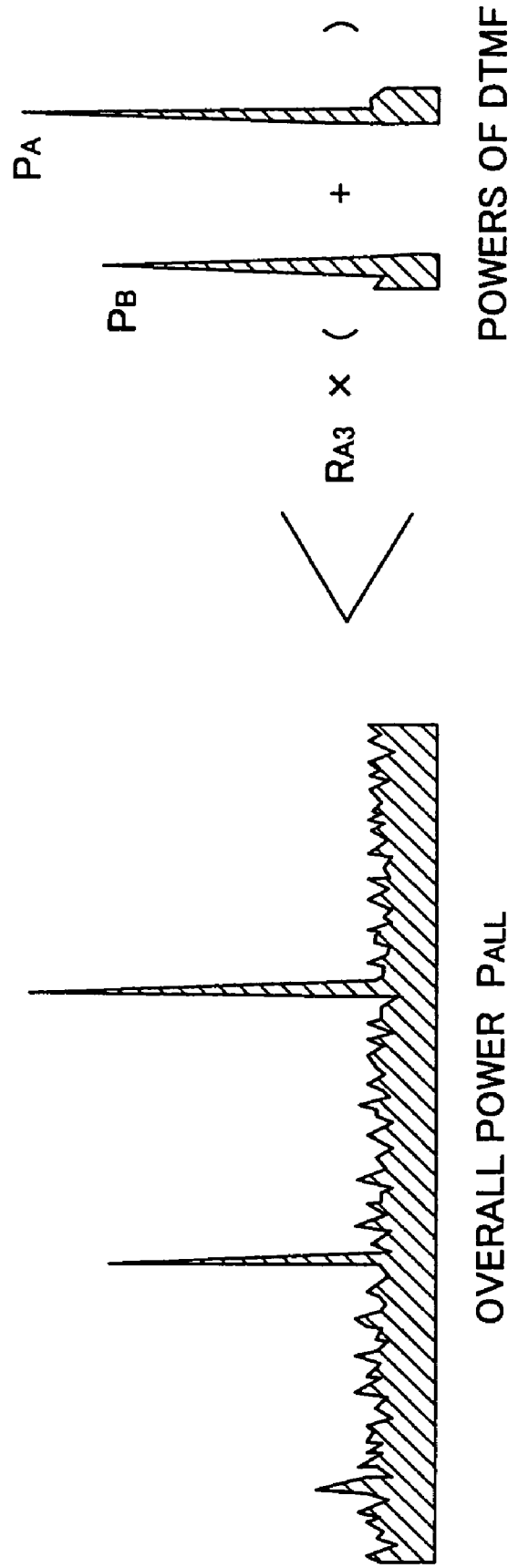
FIG. 16 illustrates a concept of one condition used in the DTMF signal detection judgement according to the second embodiment of the present invention.

FIG. 16 illustrates a concept of the condition 2-3.

[Condition 3-3]

Each of the powers at a lower frequency and a higher frequency of the DTMF signal having eight frequencies is prominent, i.e., is considerably larger than other powers detected by the DTMF detectors (the DTMF detection processing unit-F 119).

That is, $[P_A>R_{B3}\times P_{DTMF3}]$ and $[P_B>R_{C3}\times P_{DTMF3}]$ are satisfied, where $R_{B3}$ and $R_{C3}$ are predetermined rates (constants).

Figure 17:
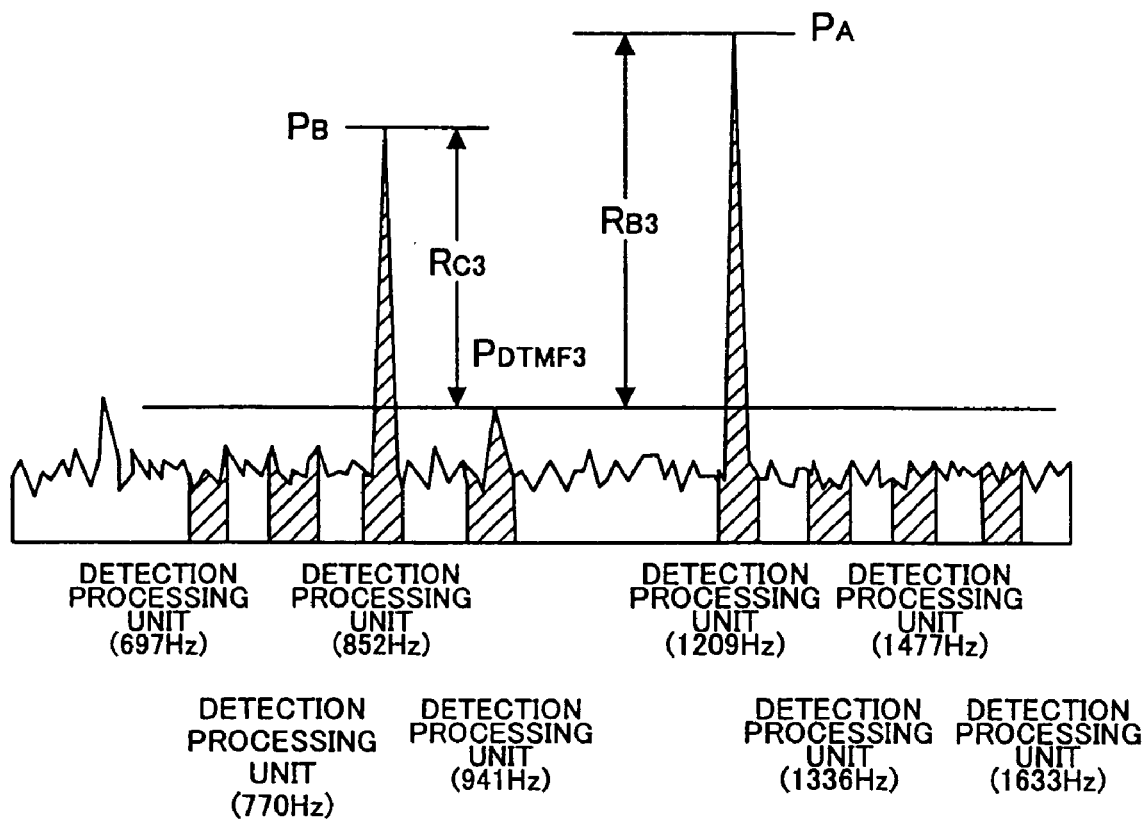
FIG. 17 illustrates a concept of one condition used in the DTMF signal detection judgment according to the second embodiment of the present invention.

FIG. 17 illustrates a concept of the condition 3-3.

[Condition 4-3]

A signal detected as the DTMF is sufficiently larger than the largest power among the powers detected by the single/dual tone detectors (the detection processing units 114 to 118), or is sufficiently larger than the second largest (i.e., second-place) power when the single/dual tone detectors are influenced by the DTMF signal.

That is, $[P_B>R_{D3}\times P_1]$ or $[P_B>R_{D3}\times P_2]$ is satisfied, where $R_{D3}$ is a predetermined rate (constant).

Figure 18:
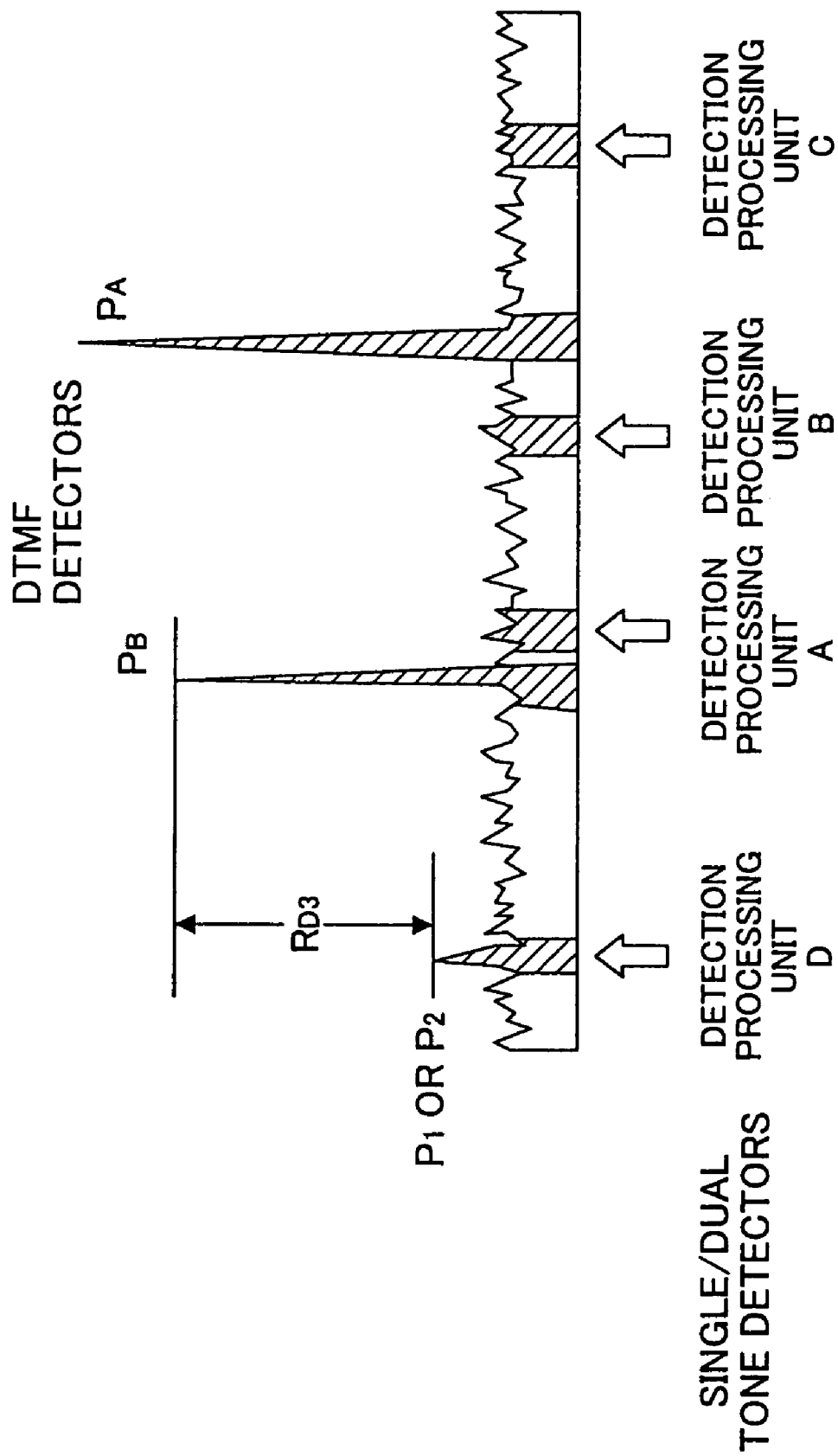
FIG. 18 illustrates a concept of one condition used in the DTMF signal detection judgment according to the second embodiment of the present invention.

FIG. 18 illustrates a concept of the condition 4-3.

In the condition 1-1, it is examined whether or not the single tone is a first-place tone having the largest power among the powers detected by the single/dual tone detectors (the detection processing units 114 to 118). Thereby, it is known whether or not the single tone in question is the largest tone among the received signals. When the single tone is not the first-place tone, it is determined that the single tone in question is not large among the received signals, which results in "undetected". On the other hand, when the single tone is the first-place tone, it is determined that the single tone in question is the largest tone among the received signals, which results in "detected".

In the condition 1-2, it is examined whether or not dual tones are first-place and second-place tones having the largest and the second largest powers among the powers detected by the single/dual tone detectors (the detection processing units 114 to 118) when the maximum tone and the second-place tone form a pair of dual tones. Thereby, it is known whether or not the dual tones are the largest tones among the received signals. When the dual tones are not the first-place and second-place tones, it is determined that the dual tones in question are not large among the received signals, which results in "undetected". On the other hand, when the dual tones are the first-place and second-place tones, it is determined that the dual tones in question are the largest tones among the received signals, which results in "detected".

In the condition 1-3, it is examined whether or not lower and higher frequency tones of the DTMF signal are first-place and second-place tones having the largest and the second largest powers among the powers detected by the DTMF detectors (the DTMF detection processing unit-F 119) when the maximum tone and the second-place tone form a pair of lower and higher frequency tones of the DTMF signal. Thereby, it is known whether or not the DTMF signal is the largest tone among the received signals. When the lower and higher frequency tones of the DTMF signal are not the first-place and second-place tones, it is determined that the DTMF signal in question is not large among the received signals, which results in "undetected". On the other hand, when the lower and higher frequency tones of the DTMF signal are the first-place and second-place tones, it is determined that the DTMF signal in question is the largest tone among the received signals, which results in "detected".

In the condition 2-1, it is examined whether or not the power of the single tone accounts for the predetermined proportion or more in the power of the received signals. Thereby, it is known whether or not the power of a frequency component of the single tone exists in the received signals. When the power of the single tone does not account for the predetermined proportion or more in the power of the received signals, it is determined that the single tone to be detected does not exist in the received signals, which results in "undetected". On the other hand, when the power of the single tone accounts for the predetermined proportion or more in the power of the received signals, it is determined that the single tone to be detected exists in the received signals, which results in "detected".

In the condition 2-2, it is examined whether or not the powers at the lower and higher frequencies of the dual tone account for the predetermined proportion or more in the power of the received signals. Thereby, it is known whether or not the powers of two frequency components of the dual tone exist in the received signals. When the powers at the lower and higher frequencies of the dual tone do not account for the predetermined proportion or more in the power of the received signals, it is determined that the dual tone to be detected does not exist in the received signals, which results in "undetected". On the other hand, when the powers at the lower and higher frequencies of the dual tone account for the predetermined proportion or more in the power of the received signals, it is determined that the dual tone to be detected exists in the received signals, which results in "detected".

In the condition 2-3, it is examined whether or not powers at a lower frequency and a higher frequency of the DTMF signal account for the predetermined proportion or more in the power of the received signals. Thereby, it is known whether or not the powers of two frequency components of the DTMF signal exist in the received signals. When the powers at a lower frequency and a higher frequency of the DTMF signal do not account for the predetermined proportion or more in the power of the received signals, it is determined that the DTMF signal to be detected does not exist in the received signals, which results in "undetected". On the other hand, when the powers at a lower frequency and a higher frequency of the DTMF signal account for the predetermined proportion or more in the power of the received signals, it is determined that the DTMF signal to be detected exists in the received signals, which results in "detected".

In the conditions 2-1 to 2-3, $R_{A1}$, $R_{A2}$ and $R_{A3}$ are predetermined rates (constants). A property (severity) of detection is determined by each of these rates (constants). The severity of detection is increased by reducing each of the rates (constants), and is reduced by increasing each of the rates (constants). Each of the rates (constants) may be preferably set approximately 2 to 4.

In the condition 3-1, it is examined whether or not the maximum tone is sufficiently larger than the second-place tone. Thereby, it is known whether or not the frequency component of the single tone is prominent. For example, while detecting a non-signal interval, signals including various frequency components are input as noises. In this case, there is no significant difference between the largest (first-place) and the second largest (second-place) powers detected by the tone detectors. Thus, when there is not a predetermined difference, it is determined that the single tone to be detected does not exist in the received signals, which results in "undetected". On the other hand, when the single tone is input, the first-place power detected by one of the tone detectors becomes so large as to make a large difference from the second-place power. Thus, when there is a predetermined difference, it is determined that the single tone to be detected exists in the received signals, which results in "detected".

In the condition 3-2, it is examined whether or not each of the powers at the two frequencies of the dual tone is considerably larger than the third largest (third-place) power among the powers detected by the single/dual tone detectors (the detection processing units 114 to 118). Thereby, it is known whether or not the frequency components of the dual tone are prominent with a sufficiently large difference from the third-place power. For example, as mentioned above, while detecting a non-signal interval, signals including various frequency components are input as noises. In this case, there are no significant differences among the largest (first-place), the second largest (second-place) and the third largest (third-place) powers detected by the tone detectors. Thus, when there is not a predetermined difference, it is determined that the dual tone to be detected does not exist in the received signals, which results in "undetected". On the other hand, when the dual-tone is input, the first-place and second-place powers detected by two of the tone detectors become so large as to make a large difference each from the third-place power. Thus, when there is a predetermined difference, it is determined that the dual tone to be detected exists in the received signals, which results in "detected".

In the condition 3-3, it is examined whether or not each of the powers at a lower frequency and a higher frequency of the DTMF signal having eight frequencies is prominent from other powers detected by the DTMF detectors (the DTMF detection processing unit-F 119). Thereby, it is known whether or not the frequency components of the DTMF signal are prominent with a sufficiently large difference from the third place power. For example, as mentioned above, while detecting a non-signal interval, signals including various frequency components are input as noises. In this case, there are no significant differences among the largest (first-place), the second largest (second-place) and the third largest (third-place) powers detected by the DTMF detectors. Thus, when there is not a predetermined difference, it is determined that the DTMF signal to be detected does not exist in the received signals, which results in "undetected". On the other hand, when the DTMF signal is input, the first-place and second-place powers detected by two of the DTMF detectors become so large as to make a large difference each from the third-place power which remains small. Thus, when there is a predetermined difference, it is determined that the DTMF signal to be detected exists in the received signals, which results in "detected".

In the conditions 3-1 to 3-3, $R_{B1}$, $R_{B1}$, $R_{C2}$, $R_{B3}$ and $R_{C3}$ are predetermined rates (constants). A property (severity) of detection is determined by each of these rates (constants). The severity of detection is increased by increasing each of the rates (constants), and is reduced by reducing each of the rates (constants). Each of the rates (constants) $R_{B1}$, $R_{B2}$ and $R_{B3}$ may be preferably set approximately 8 to 16. Each of the rates (constants) $R_{C2}$ and $R_{C3}$ may be preferably set approximately 4 to 10.

In the condition 4-1, by comparing a single tone power with a DTMF power, it is examined whether or not the single tone is sufficiently larger than the largest power among the powers detected by the DTMF detectors (the DTMF detection processing unit-F 119), in a case where the DTMF detection is simultaneously performed upon detecting the single tone. Thereby, it is known whether or not the power of a frequency component of the DTMF signal is input as a power of the frequency component of the single tone because of frequencies approximate to each other.

When the power of the single tone is not sufficiently larger than the largest power among the powers detected by the DTMF detectors, it is determined that the power of a frequency component of the DTMF signal is input as a power of the frequency component of the single tone because of the approximate frequencies, which results in "undetected". On the other hand, when the power of the single tone is sufficiently larger than the largest power among the powers detected by the DTMF detectors, it is determined that, not the power of a frequency component of the DTMF signal, but the power of the frequency component of the single tone is detected, which results in "detected".

However, when the frequencies of the single tone and the DTMF signal are approximate to each other, the power of a frequency component of the DTMF signal is inevitably input as a power of the frequency component of the single tone. In this case, the second largest (second-place) power among the powers detected by the DTMF detectors is used in the comparison with the single tone.

When the input signal is the DTMF signal, the power of the single tone is not sufficiently larger than even the second largest power among the powers detected by the DTMF detectors, because not only the largest power, but also the second largest power among the powers detected by the DTMF detectors has a considerably large power. Thus, the result "undetected" is obtained. On the other hand, when the input signal is not the DTMF signal, the power of the single tone is sufficiently larger than the second largest power among the powers detected by the DTMF detectors, because the second largest power has a small power. Thus, the result "detected" is obtained.

In the condition 4-2, by comparing a dual tone power with a DTMF power, it is examined whether or not the second-place tone element of the dual tone is sufficiently larger than the largest power among the powers detected by the DTMF detectors (the DTMF detection processing unit-F 119), in a case where the DTMF detection is simultaneously performed upon detecting the dual tone. Thereby, it is known whether or not the power of a frequency component of the DTMF signal is input as a power of a frequency component of the dual tone because of frequencies approximate to each other.

When the power of the second-place tone element of the dual tone is not sufficiently larger than the largest power among the powers detected by the DTMF detectors, it is determined that the power of a frequency component of the DTMF signal is input as a power of a frequency component of the dual tone because of the approximate frequencies, which results in "undetected". On the other hand, when the power of the second-place tone element of the dual tone is sufficiently larger than the largest power among the powers detected by the DTMF detectors, it is determined that, not the power of a frequency component of the DTMF signal, but the power of a frequency component of the dual tone is detected, which results in "detected".

Similarly as mentioned above, when the frequencies of the dual tone and the DTMF signal are approximate to each other, the second largest (second-place) power among the powers detected by the DTMF detectors is used in the comparison with the second-place tone element of the dual tone.

When the input signal is the DTMF signal, the power of the second-place tone element of the dual tone is not sufficiently larger than even the second largest power among the powers detected by the DTMF detectors, because not only the largest power, but also the second largest power among the powers detected by the DTMF detectors has a considerably large power. Thus, the result "undetected" is obtained. On the other hand, when the input signal is not the DTMF signal, the power of the second-place tone element of the dual tone is sufficiently larger than the second largest power among the powers detected by the DTMF detectors, because the second largest power has a small power. Thus, the result "detected" is obtained.

In the condition 4-3, by comparing a DTMF signal power with a single/dual tone power, it is examined whether or not a second-place signal (having the second largest power) detected as the DTMF is sufficiently larger than the largest power among the powers detected by the single/dual tone detectors (the detection processing units 114 to 118), in the case where the tone detection (regardless of whether single or dual) is simultaneously performed upon detecting the DTMF signal. Thereby, it is known whether or not the power of a frequency component of the single or dual tone is input as a power of a frequency component of the DTMF signal because of frequencies approximate to each other.

When the power of the second-place signal detected as the DTMF is not sufficiently larger than the largest power among the powers detected by the single/dual tone detectors, it is determined that the power of a frequency component of the single or dual tone is input as a power of a frequency component of the DTMF signal because of the approximate frequencies, which results in "undetected". On the other hand, when the power of the second-place signal detected as the DTMF is sufficiently larger than the largest power among the powers detected by the single/dual tone detectors, it is determined that, not the power of a frequency component of the single or dual tone, but the power of a frequency component of the DTMF signal is detected, which results in "detected".

However, when the frequencies of the single or dual tone and the DTMF signal are approximate to each other, the power of a frequency component of the single or dual tone is inevitably input as a power of the frequency component of the DTMF signal. In this case, the second largest (second-place) power among the powers detected by the single/dual tone detectors is used in the comparison with the second-place signal detected as the DTMF.

When the input signal is not the DTMF signal, but the single or dual tone, the power of the second-place signal detected as the DTMF is not sufficiently larger than even the second largest power among the powers detected by the single/dual tone detectors, because the second largest power among the powers detected by the single/dual tone detectors has a considerably large power. Thus, the result "undetected" is obtained. On the other hand, when the input signal is not the single or dual tone, but the DTMF signal, the power of even the second-place signal detected as the DTMF is sufficiently larger than the second largest power among the powers detected by the single/dual tone detectors, because the second largest power among the powers detected by the single/dual tone detectors has a small power. Thus, the result "detected" is obtained.

In the conditions 4-1 to 4-3, $R_{C1}$, $R_{D2}$ and $R_{D3}$ are predetermined rates (constants). A property (severity) of detection is determined by each of these rates (constants). The severity of detection is increased by increasing each of the rates (constants), and is reduced by reducing each of the rates (constants). The rate (constant) $R_{C1}$ may be preferably set approximately 8 to 16. Each of the rates (constants) $R_{D2}$ and $R_{D3}$ may be preferably set approximately 4 to 10.

Besides, the conditions 1, 2 and 3 may be used as independent conditions from one another. However, combinations of these conditions, such as the conditions 1 and 2, the conditions 1 and 3, the conditions 2 and 3, and the conditions 1, 2 and 3, enable a more accurate detection. Among these examples, the combination of the conditions 1, 2 and 3 enables the most accurate detection.

Figure 19:
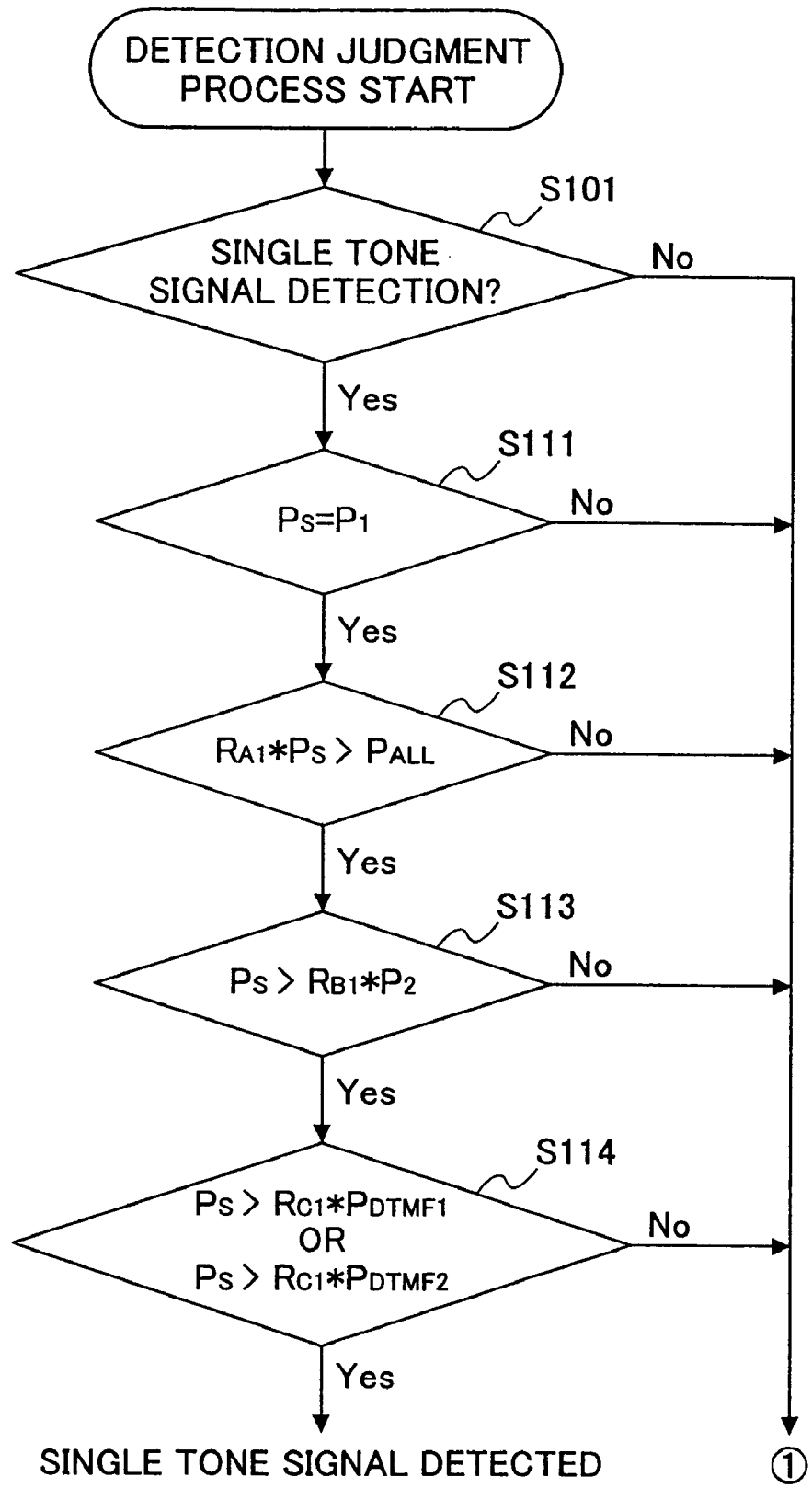
FIG. 19 is a first flowchart of a signal detection judgment process according to the second embodiment of the present invention.
Figure 20:
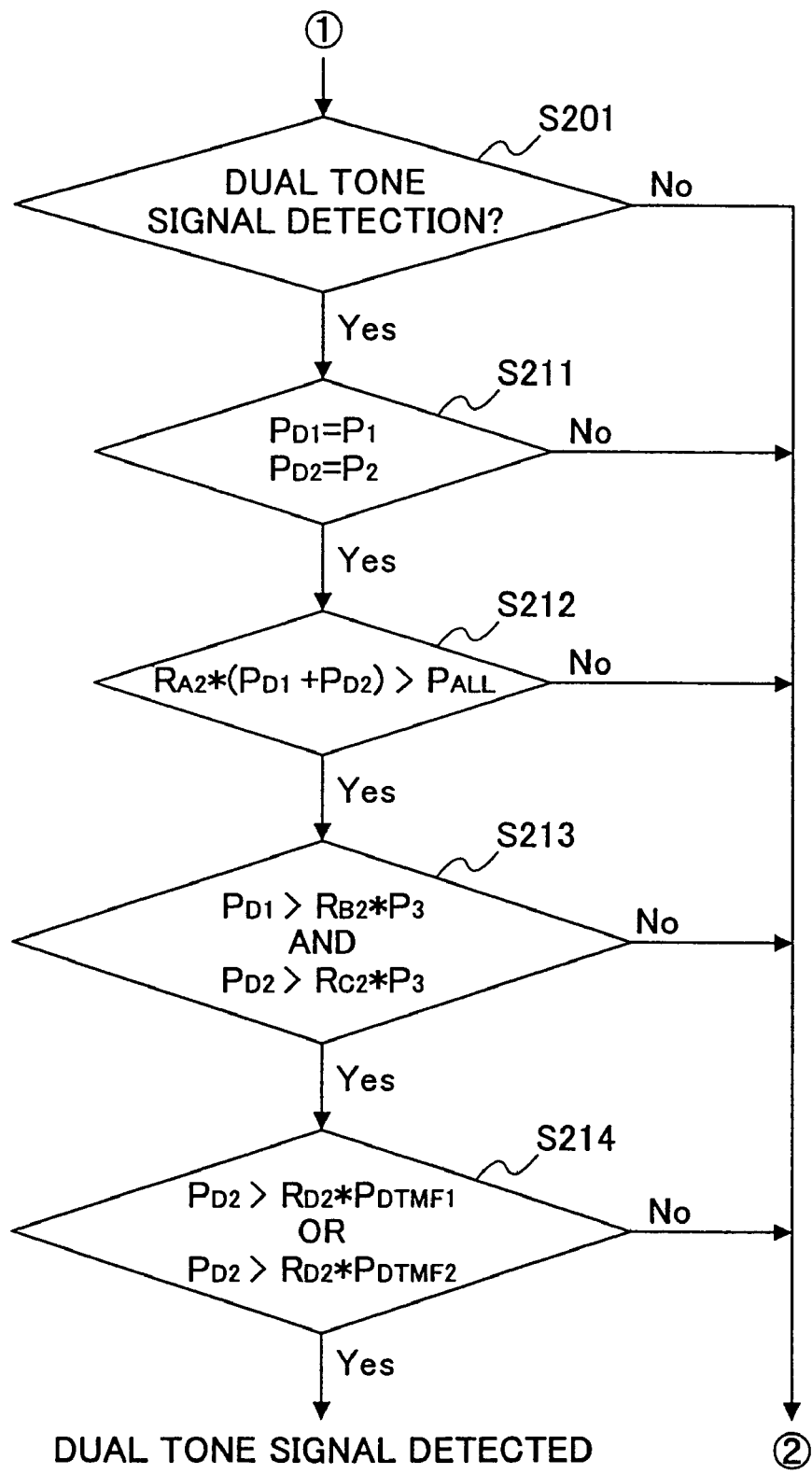
FIG. 20 is a second flowchart of the signal detection judgment process according to the second embodiment of the present invention.

FIG. 19, FIG. 20 and FIG. 21 are flowcharts of a tone signal detection judgment process.

Hereinbelow, a description will be given of operations of the tone detector 110 performing a tone signal detection process according to the above-described conditions.

First, the detection processing unit-A 114 is provided with a setting for performing a power-spectrum calculation for a frequency of a single tone to be detected. Additionally, the detection processing unit-B 115 and the detection processing unit-C 116 are provided with settings for performing power-spectrum calculations for respective frequencies of a dual tone. Further, the eight systems of a detection processing unit-$F_A$ 191 to a detection processing unit-$F_H$ 198 included in the DTMF detection processing unit-F 119 are provided with settings for performing power-spectrum calculations for respective frequencies of a DTMF signal. Besides, each of the detection processing units 114 to 118, 120, 191 to 198 forms a tone signal detection part, and the DTMF detection processing unit-F 119 a DTMF signal detection part.

Among the eight systems of the detection processing units 191 to 198 included in the DTMF detection processing unit-F 119, the detection processing unit-$F_A$ 191 and the detection processing unit-$F_B$ 192 are used for detecting a DTMF signal having targeted frequencies.

In the present embodiment, the detection processing unit-A 114, the detection processing unit-B 115 and the detection processing unit-C 116 are used for performing power-spectrum calculations for respective frequencies of a single tone and a dual tone; however, any of the detection processing unit-A 114 to the detection processing unit-E 118 may be used for performing these power-spectrum calculations. In the present embodiment, the remaining detection processing units, i.e., the detection processing unit-D 117 and the detection processing unit-E 118, are provided with settings for performing power-spectrum calculations for frequencies of other signals, in a case where these other signals have to be detected simultaneously. If there are no other signals that have to be detected simultaneously, all or part of the detection processing unit-D 117 and the detection processing unit-E 118 may be arranged not to perform detection processes, i.e., unnecessary processes.

In the present embodiment, assuming that there are other signals that have to be detected simultaneously, the detection processing unit-D 117 and the detection processing unit-E 118 are provided with settings for performing power-spectrum calculations for frequencies of those signals. As a matter of course, the frequencies of these signals are frequencies other than the frequencies subjected by the detection processing unit-A 114, the detection processing unit-B 115, the detection processing unit-C 116 and the DTMF detection processing unit-F 119.

Besides, when any of the single tone, the dual tone and the DTMF signal does not need to be detected, the corresponding detection processing unit or units may be arranged not to perform detection processes, i.e., unnecessary processes.

When the control unit 111 orders a tone detection process to be started, the A/D conversion unit 112 samples a received tone signal, converts the received tone signal into digital signal data, and transmits the digital signal data to the memory unit 113. The memory unit 113 stores the transmitted digital signal data successively.

After a predetermined time elapses when a predetermined amount of the data is stored in the memory unit 113, the control unit 111 transfers the digital signal data to the detection processing unit-A 114 to the detection processing unit-E 118, and causes the detection processing unit-A 114 to the detection processing unit-E 118 to perform detection processes for obtaining powers at the respectively set frequencies. Additionally, the control unit 111 transfers the same digital signal data to the DTMF detection processing unit-F 119, and causes the DTMF detection processing unit-F 119 to perform detection processes for obtaining powers at the eight frequencies of a DTMF signal. Further, the control unit 111 transfers the same digital signal data to the overall tone detection processing unit 120, and causes the overall tone detection processing unit 120 to perform a detection process for obtaining an overall power of the signal supplied to the A/D conversion unit 112.

In the present embodiment, each of the detection processing units obtains the power by a DFT (Discrete Fourier Transform) operation; however, the DFT operation may be replaced by other methods, such as a maximum entropy method and an FFT (Fast Fourier Transform) operation. Upon completion of the detection processes, each of the detection processing unit-A 114 to the detection processing unit-E 118, the DTMF detection processing unit-F 119 and the overall tone detection processing unit 120 informs the control unit 111 of the completion.

When all of the seven detection processing units (the detection processing unit-A 114 to the detection processing unit-E 118, the DTMF detection processing unit-F 119 and the overall tone detection processing unit 120) finish the respective detection processes, the control unit 111 orders each of the detection processing units to transmit the respectively obtained powers to the detection judgment unit 121. Upon receiving the powers from all of the detection processing units, the detection judgment unit 121 starts a judgment process.

In the judgment process, first, the above-described condition 1-1 is checked for detecting a single tone signal (YES in step S101 in FIG. 19).

Specifically, it is examined whether or not the power transmitted from the detection processing unit-A 114 is the largest (i.e., first-place) power among the powers transmitted from the detection processing unit-A 114 to the detection processing unit-E 118 (S111). When the power transmitted from the detection processing unit-A 114 is the largest (first-place) power, it is determined that the condition 1-1 is satisfied (YES in step S111). On the other hand, when the power transmitted from the detection processing unit-A 114 is not the largest (first-place) power, it is determined that the condition 1-1 is not satisfied (NO in step S111). When the condition 1-1 is not satisfied (NO in step S111), it is determined that a frequency component of the single tone does not exist in the received signal, and thus it is judged that the single tone is not detected.

Then, the detection judgment unit 121 informs the control unit 111 of this judgment result, completing the series of the processes for detecting.

When the condition 1-1 is satisfied (YES in step S111), the next condition 2-1 is checked (S112). When the single tone is not detected (NO in step S111), the conditions are checked for detecting other signals.

In the condition 2-1, it is examined whether or not the power of the single tone accounts for the predetermined proportion or more in the power of the received signal (S112). Specifically, by comparing the power transmitted from the detection processing unit-A 114 with the overall power transmitted from the overall tone detection processing unit 120, it is examined whether or not the power of the single tone accounts for the predetermined proportion or more in the overall power. When the power of the single tone accounts for the predetermined proportion or more in the overall power, it is determined that the condition 2-1 is satisfied (YES in step S112). On the other hand, when the power of the single tone does not account for the predetermined proportion or more in the overall power, it is determined that the condition 2-1 is not satisfied (NO in step S112). When the condition 2-1 is not satisfied (NO in step S112), it is determined that a frequency component of the single tone does not exist in the received signal, and thus it is judged that the single tone is not detected.

Then, the detection judgment unit 121 informs the control unit 111 of this judgment result, completing the series of the processes for detecting.

When the condition 2-1 is satisfied (YES in step S112), the next condition 3-1 is checked (S113). When the single tone is not detected (NO in step S112), the conditions are checked for detecting other signals.

In the condition 3-1, it is examined whether or not the maximum tone is sufficiently larger than the second-place tone (S113). Specifically, by comparing the power transmitted from the detection processing unit-A 114 with the largest power among the powers transmitted from the detection processing units 115 to 118, it is examined whether or not the power of the single tone is larger than the largest power among the powers transmitted from the detection processing units 115 to 118 by the predetermined rate or more. When the power of the single tone is larger by the predetermined rate or more, it is determined that the condition 3-1 is satisfied (YES in step S113). On the other hand, when the power of the single tone is not larger by the predetermined rate or more, it is determined that the condition 3-1 is not satisfied (NO in step S113). When the condition 3-1 is not satisfied (NO in step S113), it is determined that a frequency component of the single tone does not exist in the received signal, and thus it is judged that the single tone is not detected.

Then, the detection judgment unit 121 informs the control unit 111 of this judgment result, completing the series of the processes for detecting.

When the condition 3-1 is satisfied (YES in step S113), the next condition 4-1 is checked (S114), in the case where the single tone or the dual tone and the DTMF signal are simultaneously detected. When the single tone is not detected (NO in step S113), the conditions are checked for detecting other signals.

In the condition 4-1, by comparing the single tone power with the DTMF power, it is examined whether or not the single tone is sufficiently larger than the largest power among the powers detected by the DTMF detectors (the DTMF detection processing unit-F 119), in the case where the single tone detection and the DTMF detection are simultaneously performed (S114). Specifically, by comparing the power transmitted from the detection processing unit-A 114 with the largest power among the powers transmitted from the DTMF detection processing unit-F 119, it is examined whether or not the power transmitted from the detection processing unit-A 114 is larger than the largest power among the powers transmitted from the DTMF detection processing unit-F 119 by the predetermined rate or more. When the power-transmitted from the detection processing unit-A 114 is larger by the predetermined rate or more, it is determined that the condition 4-1 is satisfied (YES in step S114). When the condition 4-1 is satisfied (YES in step S114), it is determined that a frequency component of the single tone exists in the received signal, and thus it is judged that the single tone is detected. On the other hand, when the power transmitted from the detection processing unit-A 114 is not larger by the predetermined rate or more, it is determined that the condition 4-1 is not satisfied (NO in step S114). When the condition 4-1 is not satisfied (NO in step S114), it is determined that a frequency component of the single tone does not exist in the received signal, and thus it is judged that the single tone is not detected.

In this condition 4-1, when the frequency of the single tone is approximate to the frequency of the DTMF signal, and thus the DTMF detectors are influenced by the single tone, not the largest power among the powers transmitted from the DTMF detection processing unit-F 119, but the second largest power is used in the comparison with the power transmitted from the detection processing unit-A 114.

Next, the condition 1-2 is checked for detecting a dual tone signal (YES in step S201 in FIG. 20).

Specifically, it is examined whether or not the powers transmitted from the detection processing unit-B 115 and the detection processing unit-C 116 are the largest (i.e., first-place) and the second largest (i.e., second-place) powers among the powers transmitted from the detection processing unit-A 114 to the detection processing unit-E 118 (S211). When the powers transmitted from the detection processing unit-B 115 and the detection processing unit-C 116 are the largest and the second-largest powers, it is determined that the condition 1-2 is satisfied (YES in step S211). On the other hand, when the powers transmitted from the detection processing unit-B 115 and the detection processing unit-C 116 are not the largest and the second largest powers, it is determined that the condition 1-2 is not satisfied (NO in step S211). When the condition 1-2 is not satisfied (NO in step S211), it is determined that frequency components of the dual tone do not exist in the received signal, and thus it is judged that the dual tone is not detected.

Then, the detection judgment unit 121 informs the control unit 111 of this judgment result, completing the series of the processes for detecting.

When the condition 1-2 is satisfied (YES in step S211), the next condition-2-2 is checked (S212). When the dual tone is not detected (NO in step S211), the conditions are checked for detecting other signals.

In the condition 2-2, it is examined whether or not the powers at the lower and higher frequencies of the dual tone account for the predetermined proportion or more in the power of the received signal (S212). Specifically, by adding the powers transmitted from the detection processing unit-B 115 and the detection processing unit-C 116, and comparing the added power, i.e., the power of the dual tone, with the overall power transmitted from the overall tone detection processing unit 120, it is examined whether or not the power of the dual tone accounts for the predetermined proportion or more in the overall power. When the power of the dual tone accounts for the predetermined proportion or more in the overall power, it is determined that the condition 2-2 is satisfied (YES in step S212). On the other hand, when the power of the dual tone does not account for the predetermined proportion or more in the overall power, it is determined that the condition 2-2 is not satisfied (NO in step S212). When the condition 2-2 is not satisfied (NO in step S212), it is determined that frequency components of the dual tone do not exist in the received signal, and thus it is judged that the dual tone is not detected.

Then, the detection judgment unit 121 informs the control unit 111 of this judgment result, completing the series of the processes for detecting.

When the condition 2-2 is satisfied (YES in step S212), the next condition 3-2 is checked (S213). When the dual tone is not detected (NO in step S212), the conditions are checked for detecting other signals.

In the condition 3-2, it is examined whether or not each of the powers at the two frequencies of the dual tone is considerably larger than the third largest (third-place) power among the powers detected by the single/dual tone detectors (the detection processing units 114 to 118). Specifically, by comparing each of the powers transmitted from the detection processing unit-B 115 and the detection processing unit-C 116, i.e., each of the powers at the two frequencies of the dual tone, with the largest power among the powers transmitted from the detection processing unit-A 114, the detection processing unit-D 117 and the detection processing unit-E 118, it is examined whether or not each of the powers at the two frequencies of the dual tone is larger than the largest power among the powers transmitted from the detection processing units 114, 117 and 118 by the predetermined rate or more. When each of the powers at the two frequencies of the dual tone is larger by the predetermined rate or more, it is determined that the condition 3-2 is satisfied (YES in step S213). On the other hand, when each of the powers at the two frequencies of the dual tone is not larger by the predetermined rate or more, it is determined that the condition 3-2 is not satisfied (NO in step S213). When the condition 3-2 is not satisfied (NO in step S213), it is determined that frequency components of the dual tone do not exist in the received signal, and thus it is judged that the dual tone is not detected.

Then, the detection judgment unit 121 informs the control unit 111 of this judgment result, completing the series of the processes for detecting.

When the condition 3-2 is satisfied (YES in step S213), the next condition 4-2 is checked (S214), in the case where the dual tone and the DTMF signal are simultaneously detected. When the dual tone is not detected (NO in step S213), the conditions are checked for detecting other signals.

In the condition 4-2, by comparing the dual tone power with the DTMF power, it is examined whether or not the second-place tone element of the dual tone is sufficiently larger than the largest power among the powers detected by the DTMF detectors (the DTMF detection processing unit-F 119), in the case where the dual tone detection and the DTMF detection are simultaneously performed (S214). Specifically, by comparing the smaller power of the two powers transmitted from the detection processing unit-B 115 and the detection processing unit-C 116, i.e., the smaller power of the powers of the dual tone, with the largest power among the powers transmitted from the DTMF detection processing unit-F 119 (having the eight systems), it is examined whether or not the smaller power of the powers of the dual tone is larger than the largest power among the powers transmitted from the DTMF detection processing unit-F 119 by the predetermined rate or more. When the smaller power of the powers of the dual tone is larger by the predetermined rate or more, it is determined that the condition 4-2 is satisfied (YES in step S214). When the condition 4-2 is satisfied (YES in step S214), it is determined that frequency components of the dual tone exist in the received signal, and thus it is judged that the dual tone is detected. On the other hand, when the smaller power of the powers of the dual tone is not larger by the predetermined rate or more, it is determined that the condition 4-2 is not satisfied (NO in step S214). When the condition 4-2 is not satisfied (NO in step S214), it is determined that frequency components of the dual tone do not exist in the received signal, and thus it is judged that the dual tone is not detected.

In this condition 4-2, when the two frequencies of the dual tone are approximate to the frequencies of the DTMF signal, and thus the DTMF detectors are influenced by the dual tone, not the largest power among the powers transmitted from the DTMF detection processing unit-F 119, but the second largest power is used in the comparison with the smaller power of the powers of the dual tone.

Next, the condition 1-3 is checked for detecting a DTMF signal (YES in step S301 in FIG. 21).

That is, it is checked whether or not lower and higher frequency tones of the DTMF signal are first-place and second-place tones having the largest and the second largest powers among the powers detected by the DTMF detectors (the DTMF detection processing unit-F 119) when the maximum tone and the second-place tone form a pair of lower and higher frequency tones of the DTMF signal. Specifically, it is examined whether or not the powers transmitted from the detection processing unit-$F_A$ 191 and the detection processing unit-$F_B$ 192 are the largest (first-place) and the second largest (second-place) powers among the eight powers transmitted from the DTMF detection processing unit-F 119 (including the eight detection processing units 191 to 198) (S311). When the powers transmitted from the detection processing unit-$F_A$ 191 and the detection processing unit-$F_B$ 192 are the largest and the second largest powers, it is determined that the condition 1-3 is satisfied (YES in step S311). On the other hand, when the powers transmitted from the detection processing unit-$F_A$ 191 and the detection processing unit-$F_B$ 192 are not the largest and the second largest powers, it is determined that the condition 1-3 is not satisfied (NO in step S311). When the condition 1-3 is not satisfied (NO in step S311), it is determined that frequency components of the DTMF signal to be detected do not exist in the received signal, and thus it is judged that the DTMF signal is not detected.

Then, the detection judgment unit 121 informs the control unit 111 of this judgment result, completing the series of the processes for detecting.

When the condition 1-3 is satisfied (YES in step S311), the next condition 2-3 is checked (S312).

In the condition 2-3, it is examined whether or not powers at a lower frequency and a higher frequency of the DTMF signal account for the predetermined proportion or more in the power of the received signal (S312). Specifically, by adding the powers transmitted from the detection processing unit-$F_A$ 191 and the detection processing unit-$F_B$ 192, and comparing the added power, i.e., the power of the DTMF signal, with the overall power transmitted from the overall tone detection processing unit 120, it is examined whether or not the power of the DTMF signal accounts for the predetermined proportion or more in the overall power. When the power of the DTMF signal accounts for the predetermined proportion or more in the overall power, it is determined that the condition 2-3 is satisfied (YES in step S312). On the other hand, when the power of the DTMF signal does not account for the predetermined proportion or more in the overall power, it is determined that the condition 2-3 is not satisfied (NO in step S312). When the condition 2-3 is not satisfied (NO in step S312), it is determined that frequency components of the DTMF signal to be detected do not exist in the received signal, and thus it is judged that the DTMF signal is not detected.

Then, the detection judgment unit 121 informs the control unit 111 of this judgment result, completing the series of the processes for detecting.

When the condition 2-3 is satisfied (YES in step S312), the next condition 3-3 is checked (S313).

In the condition 3-3, it is examined whether or not each of the powers at a lower frequency and a higher frequency of the DTMF signal having the eight frequencies is prominent from other powers detected by the DTMF detectors (the DTMF detection processing unit-F 119). Specifically, by comparing each of the powers transmitted from the detection processing unit-$F_A$ 191 and the detection processing unit-$F_B$ 192, i.e., each of the powers at the frequencies of the DTMF signal to be detected, with the largest power among the powers transmitted from the DTMF detection processing unit-F 119 excluding the detection processing unit-$F_A$ 191 and the detection processing unit-$F_B$ 192, i.e., the third largest (third-place) power, it is examined whether or not each of the powers at the frequencies of the DTMF signal is larger than the third largest (third-place) power by the predetermined rate or more. When each of the powers at the frequencies of the DTMF signal is larger by the predetermined rate or more, it is determined that the condition 3-3 is satisfied (YES in step S313). On the other hand, when each of the powers at the frequencies of the DTMF signal is not larger by the predetermined rate or more, it is determined that the condition 3-3 is not satisfied (NO in step S313). When the condition 3-3 is not satisfied (NO in step S313), it is determined that frequency components of the DTMF signal to be detected do not exist in the received signal, and thus it is judged that the DTMF signal is not detected.

Then, the detection judgment unit 121 informs the control unit 111 of this judgment result, completing the series of the processes for detecting.

When the condition 3-3 is satisfied (YES in step S313), the next condition 4-3 is checked (S314), in the case where the DTMF signal and the single tone or the dual tone are simultaneously detected.

In the condition 4-3, by comparing the DTMF signal power with the single/dual tone power, it is examined whether or not the second-place signal (having the second largest power) detected as the DTMF is sufficiently larger than the largest power among the powers detected by the single/dual tone detectors (the detection processing units 114 to 118), in the case where the DTMF signal and the single tone or the dual tone are simultaneously detected (S314). Specifically, by comparing the smaller power of the two powers transmitted from the detection processing unit-$F_A$ 191 and the detection processing unit-$F_B$ 192, i.e., the smaller power of the two powers at the frequencies of the DTMF signal to be detected, with the largest power among the powers transmitted from the detection processing unit-A 114 to the detection processing unit-E 118, it is examined whether or not the smaller power of the two powers of the DTMF signal is larger than the largest power among the powers transmitted from the detection processing units 114 to 118 by the predetermined rate or more. When the smaller power of the two powers of the DTMF signal is larger by the predetermined rate or more, it is determined that the condition 4-3 is satisfied (YES in step S314). When the condition 4-3 is satisfied (YES in step S314), it is determined that frequency components of the DTMF signal to be detected exist in the received signal, and thus it is judged that the DTMF signal is detected. On the other hand, when the smaller power of the two powers of the DTMF signal is not larger by the predetermined rate or more, it is determined that the condition 4-3 is not satisfied (NO in step S314). When the condition 4-3 is not satisfied (NO in step S314), it is determined that Frequency components of the DTMF signal to be detected do not exist in the received signal, and thus it is judged that the DTMF signal is not detected.

In this condition 4-3, when the two frequencies of the DTMF signal are approximate to the frequencies of the single tone or the dual tone, and thus the single/dual tone detectors are influenced by the DTMF signal, not the largest power among the powers transmitted from the detection processing units 114 to 118, but the second largest power is used in the comparison with the smaller power of the two powers of the DTMF signal.

In the above-described process, the condition 1 (the conditions 1-1 to 1-3), the condition 2 (the conditions 2-1 to 2-3) and the condition 3 (the conditions 3-1 to 3-3) are checked in the foregoing order. However, since these conditions may be used as independent conditions from one another, these conditions may be checked in any order. Additionally, checking only one of these conditions may be sufficient. However, combinations of these conditions, such as the Conditions 1 and 2, the conditions 1 and 3, the conditions 2 and 3, and the conditions 1, 2 and 3, enable a more accurate detection. Among these examples, the combination of the conditions 1, 2 and 3 enables the most accurate detection.

Besides, as shown in FIG. 5, by performing the above-described detection process according to the present embodiment at the predetermined time interval T With respect to data items sampled at the predetermined sampling intervals t, detection results can be obtained at the time intervals T. Accordingly, with respect to successively input signals, detection results can be obtained in time series, and thus, the single tone, the dual tone and the DTMF signal can be detected.

Further, as already described above, in the case where the single tone or the dual tone and the DTMF signal are simultaneously detected, the second largest characteristic quantity (power) among the characteristic quantities detected by the DTMF detectors is compared with the characteristic quantity of the single tone or the dual tone; then, when the characteristic quantity of the single tone or the dual tone exists in the predetermined proportion or more, it is judged that the single tone or the dual tone is detected. Accordingly, even when the single tone or the dual tone influences the DTMF detectors, the single tone signal or the dual tone signal can be detected accurately.

Additionally, upon detecting the DTMF signal, the second largest characteristic quantity (power) among the characteristic quantities detected by the single/dual tone detectors is compared with the characteristic quantity of the DTMF signal; then, when the characteristic quantity of the DTMF signal exists in the predetermined proportion or more, it is judged that the DTMF signal is detected. Accordingly, even when the DTMF signal influences the single/dual tone detectors, the DTMF signal can be detected accurately.

Besides, various combinations of the above-described conditions including conditions for using the second largest characteristic quantity can provide the tone detector 110 with various specifications.

Further, the above-mentioned characteristic quantity may be detected as a quantity regarding a frequency, an amplitude, a phase, etc. In addition, the quantity regarding the frequency may be obtained as a power level of a frequency component. Besides, the power level of the frequency component may be obtained by a DFT (Discrete Fourier Transform) operation, an FFT (Fast Fourier Transform) operation, a maximum entropy method, a wavelet transform, a Wigner distribution and so forth.

The present invention is not limited to the specifically disclosed embodiments, and variations and modifications may be made without, departing from the scope of the present invention.

The present application is based on Japanese priority applications No. 2001-383298 filed on Dec. 17, 2001, and No. 2001-389891 filed on Dec. 21, 2001, the entire contents of which are hereby incorporated by reference.

What is claimed is:

1. A tone detector for detecting a tone signal received from a telecommunications interface, the tone detector comprising:
    a plurality of tone signal detection parts detecting respective tone signals by extracting predetermined characteristic values of the tone signals including the characteristic value of a single tone to be detected; and
    a tone judgment part judging that said single tone is detected when said characteristic value of said single tone accounts for at least a predetermined ratio in said characteristic values detected by said tone signal detection parts, and
    wherein said characteristic value of said single tone and said characteristic values detected by said tone signal detection parts are measured signal characteristics in predefined bands, and wherein said tone detector compares said measured signal characteristics to determine which tone is present; and
    wherein said single tone is not part of a DTMF signal and said determination of which tone is present is made even when said DTMF signal and said single tone are received simultaneously.

2. The tone detector as claimed in claim 1, wherein said tone judgment part judges that said single tone is detected when said characteristic value of said single tone is a largest characteristic value among all of said characteristic values detected by said tone signal detection parts.

3. The tone detector as claimed in claim 1, wherein said tone judgment part judges that said single tone is detected when said characteristic value of said single tone is larger than a second largest characteristic value among said characteristic values detected by said tone signal detection parts.

4. A tone detector for detecting a tone signal received from a telecommunications interface, the tone detector comprising:
    a tone signal detection part detecting a tone signal by extracting a predetermined characteristic value of a single tone to be detected;
    a DTMF signal detection part detecting a DTMF signal by extracting the characteristic values of said DTMF signal, wherein said characteristic value of said single tone and said characteristic values of said DTMF signal are the same type of value; and a tone judgment part judging that said single tone is detected when said characteristic value of said single tone is larger than a second largest characteristic value among said characteristic values of said DTMF signal, and wherein said characteristic value of said single tone and said characteristic values of said DTMF signal are measured signal characteristics in predefined bands, and wherein said tone detector compares said measured signal characteristics to determine which tone is present; and wherein said single tone to be detected is not part of a DTMF signal and said determination of which tone is present is made even when said DTMF signal and said single tone are received simultaneously.

5. The tone detector as claimed in claim 4, wherein said tone judgment part judges that said single tone is detected when said characteristic value of said single tone is larger than a largest characteristic value among said characteristic values of said DTMF signal detected by said DTMF signal detection part.

6. A tone detector for detecting a tone signal received from a telecommunications interface, the tone detector comprising:

a plurality of tone signal detection parts detecting respective tone signals by extracting predetermined characteristic values of the tone signals including the characteristic values at a lower frequency and a higher frequency of a dual tone to be detected; and a tone judgment part judging that said dual tone is detected when said characteristic values of said dual tone account for at least a predetermined ratio in said characteristic values detected by said tone signal detection parts, and wherein said characteristic values of said dual tone and said characteristic values detected by said tone signal detection parts are measured signal characteristics in predefined bands, and wherein said tone detector compares said measured signal characteristics to determine which tone is present; and wherein said dual tone to be detected is not part of a DTMF signal and said determination of which tone is present is made even when said dual tone and said tone signals are received simultaneously where at least one of said tone signals is different from said dual tone.

7. The tone detector as claimed in claim 6, wherein said tone judgment part judges that said dual tone is detected when said characteristic values of said dual tone are a largest characteristic value and a second largest characteristic value among all of said characteristic values detected by said tone signal detection parts.

8. A tone detector for detecting a tone signal received from a telecommunications interface, the tone detector comprising:

a plurality of tone signal detection parts detecting respective tone signals by extracting predetermined characteristic values of the tone signals including the characteristic values at a lower frequency and a higher frequency of a dual tone to be detected, and wherein said dual tone is not a DTMF signal; and a tone judgment part judging that said dual tone is detected when each of said characteristic values of said dual tone is larger than a third largest characteristic value among said characteristic values detected by said tone signal detection parts, and wherein said characteristic values of said dual tone and said characteristic values detected by said tone signal detection parts are measured signal characteristics in predefined bands, and wherein said tone detector compares said measured signal characteristics to determine which tone is present; and wherein said dual tone to be detected is not part of a DTMF signal and said determination of which tone is present is made even when said dual tone and said tone signals are received simultaneously, where at least one of said tone signals is different from said dual tone.

9. A tone detector for detecting a tone signal received from a telecommunications interface, the tone detector comprising:

a plurality of tone signal detection parts detecting respective tone signals by extracting predetermined characteristic values of a dual tone to be detected;

a DTMF signal detection part detecting a DTMF signal by extracting the characteristic values of said DTMF signal; and a tone judgment part judging that said dual tone is detected when a second largest characteristic value of said characteristic values of said dual tone is larger by at least a predetermined ratio than a largest characteristic value among said characteristic values of said DTMF signal, and wherein said characteristic values of said dual tone and said characteristic values of said DTMF signal are measured signal characteristics in predefined bands, and wherein said tone detector compares said measured signal characteristics to determine which tone is present; and wherein said dual tone to be detected is not part of a DTMF signal and said determination of which tone is present is made even when said dual tone and said DTMF signal are received simultaneously.

10. The tone detector as claimed in claim 9, wherein said tone judgment part judges that said dual tone is detected when said second largest characteristic value of said characteristic values of said dual tone is larger by at least a predetermined ratio than a second largest characteristic value among said characteristic values of said detected DTMF signal.

11. A tone detector for detecting a tone signal received from a telecommunications interface, the tone detector comprising:

a plurality of tone signal detection parts detecting respective tone signals by extracting predetermined characteristic values of the tone signals including the characteristic values of a DTMF signal to be detected; and a tone judgment part judging that said DTMF signal is detected when the characteristic values at a lower frequency and a higher frequency of said DTMF signal account for at least a predetermined ratio in all of said characteristic values detected by said tone signal detection parts, wherein said judging is performed even when said tone signals and said DTMF signal are received simultaneously and at least one of said tone signals is different from said DTMF signal.

12. The tone detector as claimed in claim 11, wherein said tone judgment part judges that said DTMF signal is detected when the characteristic values at a lower frequency and a higher frequency of said DTMF signal are a largest characteristic value and a second largest characteristic value among all of said characteristic values detected by said tone signal detection parts.

13. A tone detector for detecting a tone signal received from a telecommunications interface, the tone detector comprising:

a plurality of tone signal detection parts detecting respective tone signals by extracting predetermined characteristic values of the tone signals including the characteristic values of a DTMF signal to be detected; and a tone judgment part judging that said DTMF signal is detected when each of the characteristic values at a lower frequency and a higher frequency of said DTMF signal is larger by at least a predetermined rate than a third largest characteristic value among all of said characteristic values detected by said tone signal detection parts, wherein said judging is performed even when said tone signals and said DTMF signal are received simultaneously and at least one of said tone signals is different from said DTMF signal.

14. A tone detector for detecting a tone signal received from a telecommunications interface, the tone detector comprising:

a plurality of DTMF signal detection parts detecting a DTMF signal to be detected by extracting predetermined characteristic values of said DTMF signal;

a single/dual tone signal detection part detecting at least one of single and dual tone signals by extracting the characteristic values of said single and dual tone signals; and a tone judgment part judging that said DTMF signal is detected when a second largest characteristic value of said characteristic values of said DTMF signal is larger by at least a predetermined rate than a largest characteristic value among said characteristic values of all of said single and dual tone signals, wherein said judging is performed even when said DTMF signal and said single and dual tone signals are received simultaneously.

15. The tone detector as claimed in claim 14, wherein said tone judgment part judges that said DTMF signal is detected when said second largest characteristic value of said characteristic values of said DTMF signal is larger by at least a predetermined rate than a second largest characteristic value among said characteristic values of all of said single and dual tone signals.

* * * * *